(12) United States Patent
Tseng et al.

(10) Patent No.: US 10,364,159 B2
(45) Date of Patent: Jul. 30, 2019

(54) PROCESS AND SYSTEMS FOR REGENERATING ALKALI PROCESS STREAMS

(71) Applicant: GRAYMONT WESTERN US INC., Sandy, UT (US)

(72) Inventors: Shiaw Tseng, Pittsburgh, PA (US); Jared Leikam, West Jordan, UT (US); Carl Paystrup, Sandy, UT (US)

(73) Assignee: GRAYMONT WESTERN US INC., Sandy, UT (US)

( * ) Notice: Subject to any disclaimer, the term of this patent is extended or adjusted under 35 U.S.C. 154(b) by 0 days.

(21) Appl. No.: 15/571,483

(22) PCT Filed: May 4, 2016

(86) PCT No.: PCT/US2016/030804
§ 371 (c)(1),
(2) Date: Nov. 2, 2017

(87) PCT Pub. No.: WO2016/179294
PCT Pub. Date: Nov. 10, 2016

(65) Prior Publication Data
US 2018/0134573 A1    May 17, 2018

Related U.S. Application Data

(60) Provisional application No. 62/156,703, filed on May 4, 2015.

(51) Int. Cl.
| C01F 11/00 | (2006.01) |
| C01F 11/46 | (2006.01) |
| C01G 1/10 | (2006.01) |
| C01F 11/18 | (2006.01) |
| C22B 3/02 | (2006.01) |
| C22B 26/00 | (2006.01) |
| C01D 1/04 | (2006.01) |

(Continued)

(52) U.S. Cl.
CPC .............. *C01F 11/468* (2013.01); *C01D 1/04* (2013.01); *C01D 1/28* (2013.01); *C01F 5/22* (2013.01); *C01F 5/40* (2013.01); *C01F 11/18* (2013.01); *C01F 11/46* (2013.01); *C01G 1/10* (2013.01); *C22B 3/02* (2013.01); *C22B 26/00* (2013.01); *C22B 26/10* (2013.01); *Y02P 10/234* (2015.11)

(58) Field of Classification Search
CPC ....... C01F 11/18; C01F 11/468; C01F 11/462; C01F 5/40; C01F 5/22; C01D 1/28; C01D 1/04; C22B 26/10
See application file for complete search history.

(56) References Cited

U.S. PATENT DOCUMENTS

| 3,642,435 A | * | 2/1972 | Allen ........................ C22B 3/06 423/109 |
| 3,816,105 A | * | 6/1974 | McKay ............... C22B 15/0063 75/718 |

(Continued)

*Primary Examiner* — Steven J Bos
(74) *Attorney, Agent, or Firm* — Fortem IP LLP; Vijay Kumar

(57) ABSTRACT

Processes for regenerating alkali process streams are disclosed herein, including streams containing sodium hydroxide, magnesium hydroxide, and combinations thereof. Systems for regenerating alkali process streams are disclosed herein, including streams containing sodium hydroxide, magnesium hydroxide, and combinations thereof.

24 Claims, 15 Drawing Sheets

(51) Int. Cl.
*C01D 1/28* (2006.01)
*C01F 5/22* (2006.01)
*C01F 5/40* (2006.01)
*C22B 26/10* (2006.01)

(56) References Cited

U.S. PATENT DOCUMENTS

| | | | | |
|---|---|---|---|---|
| 3,840,365 | A | * | 10/1974 | Hammes, Sr. ............ C22B 3/04 |
| | | | | 204/248 |
| 4,153,522 | A | * | 5/1979 | Arbiter ............... C22B 15/0078 |
| | | | | 205/580 |
| 5,484,579 | A | * | 1/1996 | O'Brien .................. C22B 3/065 |
| | | | | 423/106 |
| 6,790,352 | B1 | * | 9/2004 | Wurzburger ............. C01F 5/22 |
| | | | | 210/195.1 |
| 7,842,120 | B2 | * | 11/2010 | Abe ...................... C22B 3/0005 |
| | | | | 423/36 |

\* cited by examiner

| A | B | C | D | E | F | G | H | I | J | K | L | M | N | O | P | Q | R | S | T |
|---|---|---|---|---|---|---|---|---|---|---|---|---|---|---|---|---|---|---|---|
| 1 | 0 | 5 | 0 | -5 | 495 | 0 | 7.64 | 70.3 | 42 | 8009 | 4004 | 4004 | 15691 | 7845 | 7845 | 23420 | 11232 | 11593 | 0 |
| 2 | 5 | 5 | 5 | -5 | 500 | 165 | 7.83 | 71.6 | 129 | 7768 | 3884 | 3964 |  | 7775 | 7767 | 22463 | 11232 | 11477 | 245 |
| 3 | 10 | 5 | 10 | -5 | 500 | 330 | 7.99 | 71.9 | 277 | 8070 | 4035 | 3925 |  | 7775 | 7689 | 23439 | 11720 | 11362 | -358 |
| 4 | 15 | 5 | 15 | -5 | 500 | 495 | 8.08 | 71.7 | 395 | 7879 | 3940 | 3885 | 15691 | 7775 | 7612 | 22986 | 11493 | 11248 | -245 |
| 5 | 20 | 5 | 20 | -5 | 500 | 661 | 8.13 | 71.4 | 413 | 7598 | 3799 | 3847 |  | 7845 | 7536 | 22610 | 11305 | 11136 | -169 |
| 6 | 25 | 5 | 25 | -5 | 500 | 826 | 8.16 | 71.2 | 426 | 7436 | 3718 | 3808 |  | 7845 | 7461 | 22351 | 11175 | 11025 | -151 |
| 7 | 30 | 5 | 30 | -5 | 500 | 991 | 8.18 | 71.2 | 466 | 7378 | 3689 | 3770 |  | 7845 | 7386 | 22357 | 11168 | 10914 | -254 |
| 8 | 35 | 5 | 35 | -5 | 500 | 1156 | 8.22 | 71.1 | 459 | 6969 | 3485 | 3732 |  | 7845 | 7312 | 21607 | 10803 | 10805 | 2 |
| 9 | 40 | 5 | 40 | -5 | 500 | 1321 | 8.24 | 70.9 | 497 | 7020 | 3510 | 3695 | 15216 | 7845 | 7239 | 22086 | 11043 | 10697 | -346 |
| 10 | 45 | 5 | 45 | -5 | 500 | 1486 | 8.28 | 70.8 | 530 | 6784 | 3392 | 3658 |  | 7608 | 7167 | 21745 | 10872 | 10590 | -282 |
| 11 | 50 | 5 | 50 | -5 | 500 | 1652 | 8.32 | 70.8 | 544 | 6500 | 3250 | 3622 |  | 7608 | 7095 | 21226 | 10613 | 10484 | -129 |
| 12 | 55 | 5 | 55 | -5 | 500 | 1817 | 8.36 | 70.8 | 553 | 6175 | 3087 | 3585 |  | 7608 | 7024 | 20650 | 10325 | 10379 | 55 |
| 13 | 60 | 5 | 60 | -5 | 500 | 1982 | 8.41 | 70.8 | 586 | 6156 | 3078 | 3549 | 15103 | 7608 | 6954 | 21021 | 10511 | 10276 | -235 |
| 14 | 65 | 5 | 65 | -5 | 500 | 2147 | 8.45 | 70.9 | 640 | 6059 | 3030 | 3514 |  | 7608 | 6884 | 20946 | 10473 | 10173 | -300 |
| 15 | 70 | 5 | 70 | -5 | 500 | 2312 | 8.50 | 71.0 | 614 | 5693 | 2846 | 3479 |  | 7551 | 6816 | 19962 | 9981 | 10071 | 90 |
| 16 | 75 | 5 | 75 | -5 | 500 | 2477 | 8.55 | 70.8 | 645 | 5617 | 2809 | 3444 |  | 7551 | 6747 | 20005 | 10002 | 9970 | -32 |
| 17 | 80 | 5 | 80 | -5 | 500 | 2643 | 8.61 | 71.1 | 660 | 5419 | 2710 | 3410 | 15020 | 7551 | 6680 | 19672 | 9836 | 9871 | 35 |
| 18 | 85 | 5 | 85 | -5 | 500 | 2808 | 8.67 | 71.1 | 723 | 5222 | 2611 | 3375 |  | 7551 | 6613 | 19438 | 9719 | 9772 | 53 |
| 19 | 90 | 5 | 90 | -5 | 500 | 2973 | 8.73 | 71.0 | 721 | 5222 | 2611 | 3342 |  | 7551 | 6547 | 19853 | 9926 | 9674 | -252 |
| 20 | 95 | 5 | 95 | -5 | 500 | 3138 | 8.79 | 71.0 | 737 | 4997 | 2498 | 3308 | 15020 | 7510 | 6482 | 19495 | 9747 | 9578 | -170 |
| 21 | 100 | 5 | 100 | -5 | 500 | 3303 | 8.85 | 70.9 | 729 | 4718 | 2359 | 3275 |  | 7510 | 6417 | 19005 | 9503 | 9482 | -21 |
| 22 | 105 | 5 | 105 | -5 | 500 | 3468 | 8.89 | 70.9 | 700 | 4516 | 2258 | 3242 |  | 7510 | 6353 | 18610 | 9305 | 9387 | 82 |
| 23 | 110 | 5 | 110 | -5 | 500 | 3634 | 8.91 | 70.9 | 653 | 4308 | 2154 | 3210 |  | 7510 | 6289 | 18101 | 9051 | 9293 | 243 |
| 24 | 115 | 5 | 115 | -5 | 500 | 3799 | 8.93 | 70.9 | 674 | 4131 | 2065 | 3178 |  | 7510 | 6226 | 17854 | 8927 | 9200 | 273 |
| 25 | 120 | 5 | 120 | -5 | 500 | 3964 | 8.95 | 70.8 | 468 | 2694 | 1347 | 3146 | 13883 | 7510 | 6164 | 11715 | 8825 | 9108 | 283 |
| 26 | 125 | 5 | 125 | -5 | 500 | 4129 | 8.97 | 70.9 | 588 | 3877 | 1938 | 3115 |  | 6941 | 6102 | 17349 | 8675 | 9017 | 342 |
| 27 | 130 | 5 | 130 | -5 | 500 | 4294 | 8.98 | 71.1 | 522 | 3792 | 1896 | 3084 |  | 6941 | 6041 | 17346 | 8673 | 8927 | 254 |
| 28 | 135 | 5 | 135 | -5 | 500 | 4459 | 8.96 | 71.5 | 502 | 3663 | 1831 | 3053 |  | 6941 | 5981 | 17075 | 8537 | 8838 | 300 |
| 29 | 140 | 5 | 140 | -5 | 500 | 4625 | 8.85 | 73.3 | 433 | 4074 | 2037 | 3022 |  | 6941 | 5921 | 17606 | 8803 | 8749 | -54 |
| 30 | 145 | 5 | 145 | -5 | 500 | 4790 | 8.88 | 72.5 | 432 | 4201 | 2101 | 2992 | 13127 | 6941 | 5862 | 18045 | 9023 | 8662 | -361 |
| 31 | 150 | 5 | 150 | -5 | 500 | 4955 | 8.94 | 70.5 | 556 | 4311 | 2155 | 2962 |  | 6563 | 5803 | 18248 | 9124 | 8575 | -549 |
| 32 | 155 | 5 | 155 | -5 | 500 | 5120 | 8.99 | 70.3 | 475 | 3955 | 1978 | 2932 |  | 6563 | 5745 | 17396 | 8698 | 8489 | -209 |
| 33 | 160 | 5 | 160 | -5 | 500 | 5285 | 9.01 | 70.6 | 474 | 3890 | 1945 | 2903 |  | 6563 | 5688 | 17322 | 8661 | 8405 | -257 |
| 34 | 165 | 5 | 165 | -5 | 500 | 5450 | 9.02 | 70.7 | 453 | 3465 | 1733 | 2874 |  | 6563 | 5631 | 16354 | 8177 | 8320 | 143 |
| 35 | 170 | 5 | 170 | -5 | 500 | 5616 | 9.03 | 70.7 | 492 | 3629 | 1815 | 2845 | 13401 | 6701 | 5575 | 16793 | 8397 | 8237 | -159 |

PROCESS AND SYSTEMS FOR REGENERATING ALKALI PROCESS STREAMS

CROSS-REFERENCE TO RELATED APPLICATIONS

This application claims priority to U.S. Provisional Patent Application No. 62/156,703, entitled "PROCESSES AND SYSTEMS FOR REGENERATING ALKALI PROCESS STREAMS," filed May 4, 2015, and International Application No. PCT/US2016/030804, entitled "PROCESSES AND SYSTEMS FOR REGENERATING ALKALI PROCESS STREAMS." filed May 4, 2016, the contents of which are incorporated herein by reference in their entirety.

TECHNICAL FIELD

The present disclosure relates generally to mineral processing. More specifically, the present disclosure relates to processes and systems for regenerating alkali process streams.

BRIEF DESCRIPTION OF THE DRAWINGS

The embodiments disclosed herein will become more fully apparent from the following description and appended claims, taken in conjunction with the accompanying drawings. The drawings depict primarily generalized embodiments, which embodiments will be described with additional specificity and detail in connection with the drawings in which:

FIG. 7 (composed of FIGS. 7A and 7B) illustrates data generated during the experiments of Example 1.

DETAILED DESCRIPTION

Figure 1:
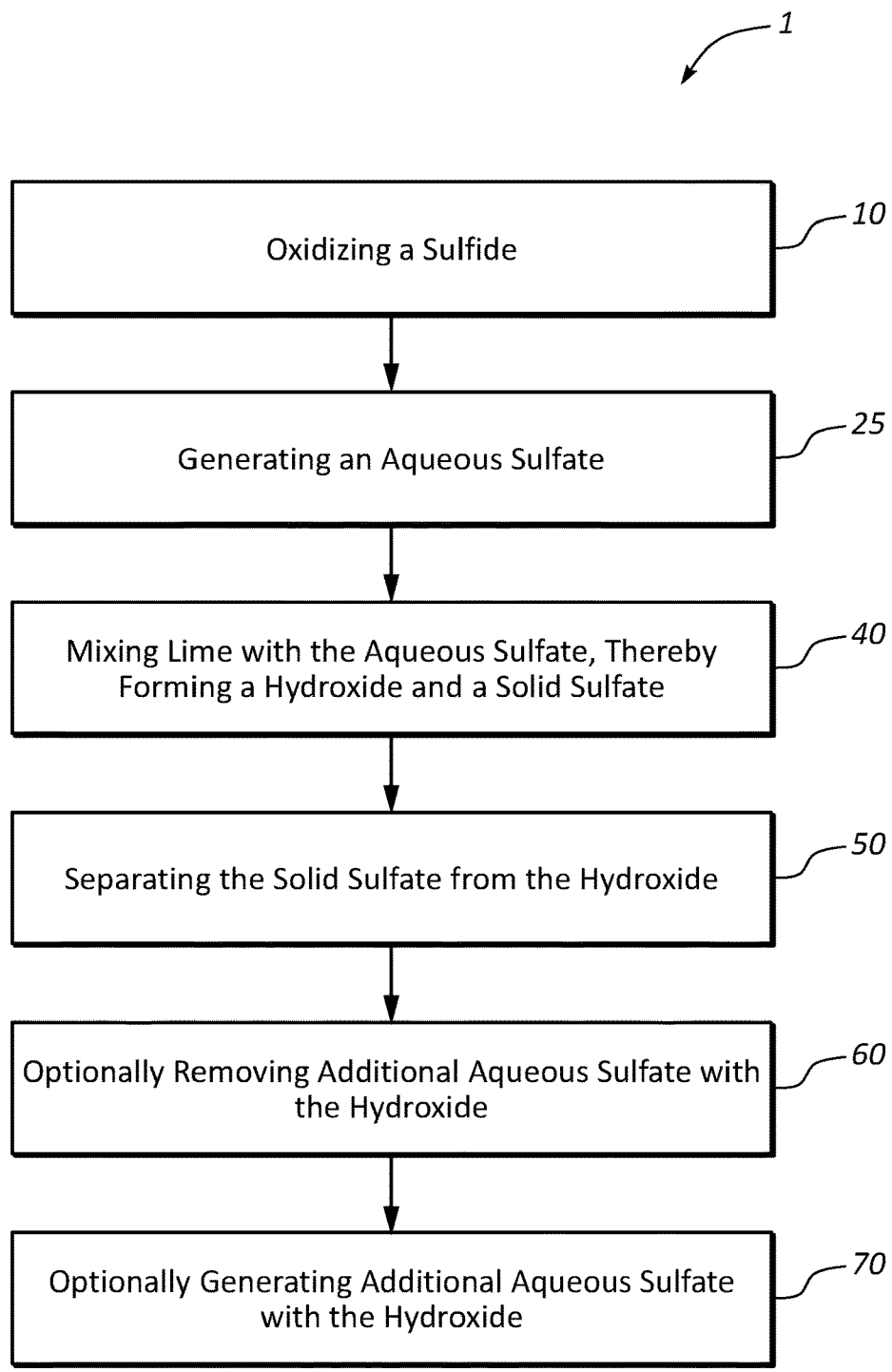
FIG. 1 illustrates one embodiment of a process for regenerating alkali streams.

Processes and systems for regenerating alkali process streams are disclosed herein. The processes and systems relate to oxidation of sulfides, in particular, metal sulfides. Oxidation of metal sulfides can be important for recovery of metals, such as gold and silver, from raw sulfidic ores or sulfidic ore concentrates.

In some embodiments, a process for regenerating alkali streams comprises oxidizing an ore containing a metal sulfide (e.g., as part of a sulfidic ore) in an oxidizer solution, mixing alkali metal- or alkali earth metal-containing compounds with the oxidizer solution and generating an aqueous sulfate, separating solid oxidized ore from the aqueous sulfate, and mixing lime with the aqueous sulfate, thereby forming hydroxide and solid sulfate. The process may further comprise separating the solid sulfate from hydroxide and generating additional aqueous sulfate with the hydroxide.

In some embodiments, a system for regenerating alkali streams comprises an ore supply system, an oxidizing agent supply system, a pH modifier supply system configured to supply alkali metal- or alkali earth metal-containing compounds, and an oxidizer system in communication with the ore supply system, the oxidizing agent supply system, and the pH modifier supply system, the oxidizer system configured to oxidize sulfidic ore. The system may further comprise a first separation system in communication with the oxidizer system and configured to receive solid oxidized ore and aqueous sulfates from the oxidizer system and configured to separate the solid oxidized ore from the aqueous sulfates. The system may further comprise a regeneration system in communication with the first separation system and configured to receive at least a portion of the aqueous sulfates, the regeneration system in communication with a lime supply system and configured to react the aqueous sulfates with calcium hydroxide, magnesium hydroxide, or both from the lime supply system, and thereby form solid calcium sulfate and additional hydroxide. The system may further comprise a second separation system in communication with the regeneration system and configured to separate the solid calcium sulfate from the additional hydroxide and any residual calcium hydroxide or magnesium hydroxide from the lime supply system. The system may further comprise a recycle system in communication with the second separation system and the pH modifier supply system. The recycle system may be configured to direct the additional hydroxide and any residual magnesium hydroxide from the second separation system to the pH modifier supply system.

The phrase "in communication with" is used in its ordinary sense, and is broad enough to refer to any suitable coupling or other form of interaction between two or more entities or systems, including mechanical, electrical, magnetic, electromagnetic, fluid, and thermal interaction. Two components or systems may interact with each other even though they are not in direct contact with each other. For example, two components or systems may be coupled to each other through an intermediate component or system.

FIG. 1 illustrates one embodiment of a process 1 for regenerating alkali streams. Step 10 comprises oxidizing a sulfide. The oxidizing may be conducted at atmospheric pressure or increased pressure (such as, for example, about 30 bar or less). The oxidation may be conducted at ambient temperature or higher (such as, for example, 300° C. or less). The oxidation may be conducted under acidic or alkaline conditions.

Step 25 comprises generating an aqueous sulfate. Oxidizing the sulfide may produce sulfuric acid. The sulfuric acid may be reacted with an alkali metal- or alkali earth metal-containing compounds to generate an aqueous sulfate. The alkali metal or alkali earth metal sulfate may comprise potassium sulfate, sodium sulfate, lithium sulfate, magnesium sulfate, or combinations thereof. The alkali metal- or alkali earth metal-containing compounds may comprise an alkali metal or alkali earth metal hydroxide, such as, for example, sodium hydroxide, potassium hydroxide, lithium hydroxide, magnesium hydroxide, or combinations thereof. The alkali metal-containing compounds may comprise an alkali metal or alkali earth metal carbonate, such as, for example, trisodium hydrogendicarbonate dihydrate, sodium carbonate, sodium bicarbonate, potassium carbonate, potassium bicarbonate, lithium carbonate, lithium bicarbonate, magnesium carbonate, or combinations thereof. The alkali metal- or alkali earth metal-containing compounds may be used to control the pH of the oxidizing. Step 25 may be performed in the same reaction vessel as step 10.

Step 40 comprises mixing lime with the aqueous sulfate, thereby forming a hydroxide and a solid sulfate. The lime may comprise quicklime, slaked lime, dolomitic lime, or combinations thereof. The lime may be mixed dry or as an aqueous slurry.

As used herein, unless specified otherwise, "quicklime" refers to materials comprised primarily of calcium oxide ("CaO"), such as materials derived from the calcination of limestone or other calcium carbonate-containing substances.

As used herein, unless specified otherwise, "slaked lime," also known as hydrated lime, refers to materials comprised primarily of calcium hydroxide ("Ca(OH)$_2$"), such as materials derived from mixing quicklime with water.

As used herein, unless specified otherwise, "dolomitic lime" refers to materials derived from the calcination of dolomite. "Dolomitic quicklime" refers to materials comprised primarily of calcium oxide and magnesium oxide. "Slaked dolomitic lime," also known as hydrated dolomitic lime, refers to materials comprised primarily of calcium hydroxide and magnesium hydroxide. Unless specified, "dolomitic lime" encompasses dolomitic quicklime, slake dolomitic lime, and combinations thereof.

Step 50 comprises separating solid sulfate from hydroxide. The solid sulfate may comprise calcium sulfate or gypsum. The hydroxide may be aqueous, solid, or a combination thereof. The hydroxide may be residual hydroxide from step 25, hydroxide introduced with the lime at step 40, and/or generated by reaction with the aqueous sulfate at step 40. For example, solid magnesium hydroxide and aqueous sodium hydroxide may be separated from solid calcium sulfate.

Step 60 comprises optionally removing additional calcium ions from the hydroxide. Removing calcium ions may comprise mixing carbonate ion-generating compounds with the aqueous hydroxide and separating solid calcium carbonate from the aqueous hydroxide. "Carbonate ion-generating compounds," as used herein, refers to any compound that releases carbonate ions upon solubilizing in water.

Step 70 comprises optionally generating additional aqueous sulfate with the hydroxide (aqueous and/or solid). For example, the hydroxide of step 70 may be recycled to step 25 to generate additional aqueous sulfate.

The process 1 may include steps not shown in FIG. 1. Processes with any sub-combination of the steps of FIG. 1 are also within the scope of this disclosure.

Figure 2:
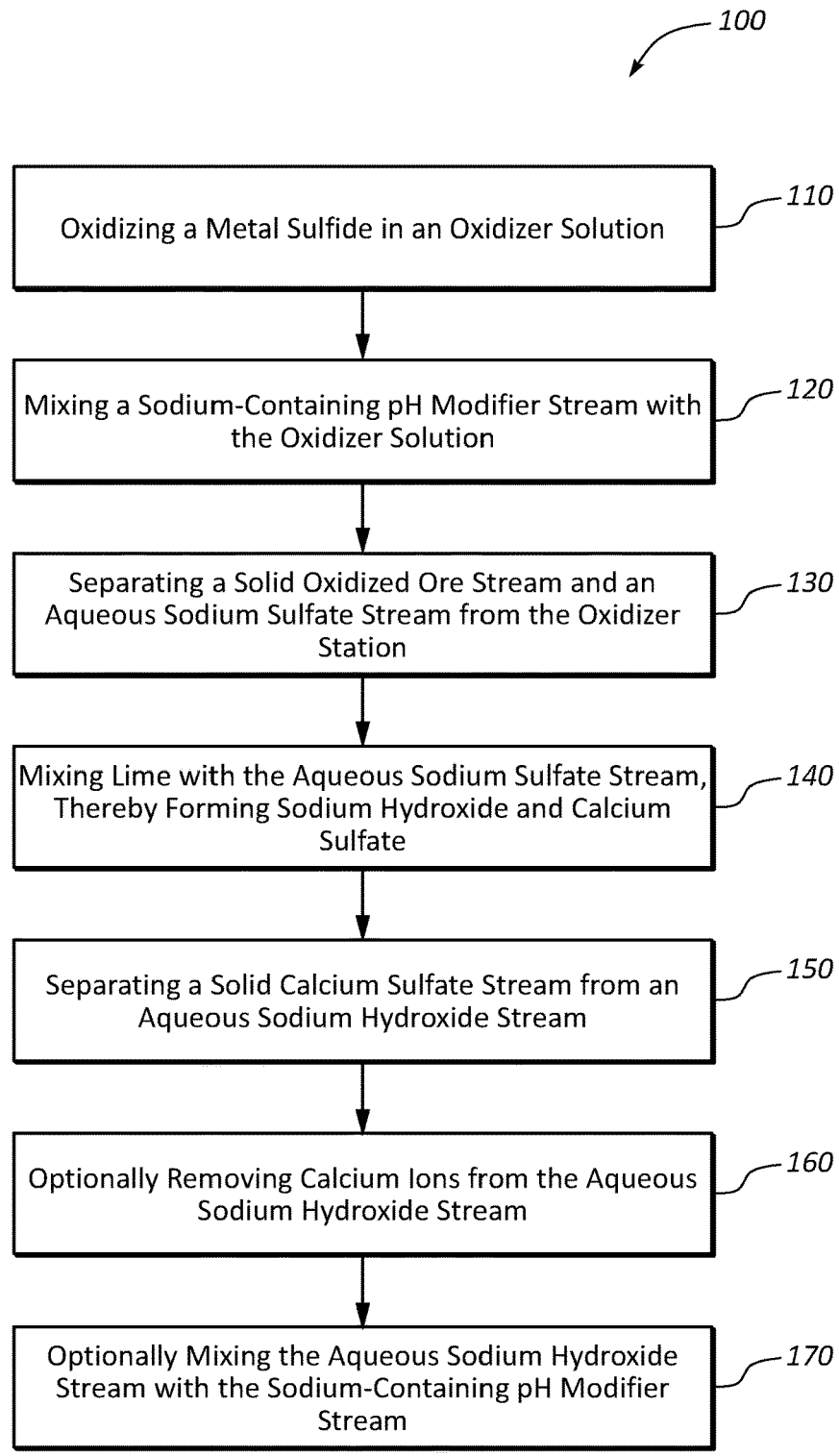
FIG. 2 illustrates another embodiment of a process for regenerating alkali streams.

FIG. 2 illustrates one embodiment of a process 100 for regenerating alkali streams. The process 100 encompasses specific embodiments of the steps of process 1. The process 100 disclosure applies to the process 1 as well, but does not limit it. In particular, the disclosure relating to the process 100 steps applies to the process 1 steps with similar numbers.

Step 110 of the process 100 comprises oxidizing a metal sulfide in an oxidizer solution. An example of a metal sulfide is iron sulfide ("FeS$_2$"), such as in pyrite and marcasite. For example, ore containing iron sulfide may comprise precious metals, such as gold and silver, in the grain boundaries of the pyrite and/or distributed throughout the pyrite matrix. The same can be true for other sulfides, such as other metal sulfides.

The oxidizing process may be continuous, a semi-batch process, or a batch process. The metal sulfide may be supplied to the oxidizing process in a number of forms, such as, by way of non-limiting example, raw ore, milled ore, flotation concentrate, and flotation tailings. One of ordinary skill in the art, having the benefit of this disclosure, will recognize that metal sulfide may be supplied to the oxidizing solution in a number of forms and ways.

The oxidizing may be conducted at atmospheric pressure or increased pressure. Non-limiting examples of increased pressure include 30 bar or less. The pressure may be supplied by a gaseous oxidizer, such as oxygen gas and/or air.

The oxidizing may be conducted at ambient temperature or higher. Non-limiting examples of higher temperature include 300° C. or less.

The oxidizing may be conducted under acidic or alkaline conditions. In some embodiments, the oxidizing may be conducted under alkaline conditions at a pH greater than about 8, greater than about 9, or greater than about 10. Additionally, in such embodiments, the oxidation may be conducted at about ambient temperature to about 50° C. or about ambient temperature to about 40° C. Alternatively, or in addition thereto, in such embodiments, the oxidation may be conducted at atmospheric pressure.

Step 120 comprises mixing a sodium-containing pH modifier stream with the oxidizer solution of step 110. The sodium-containing pH modifier stream may be used to control the pH of the oxidizer solution. The sodium-containing pH modifier stream may comprise sodium hydroxide, trisodium hydrogendicarbonate dihydrate (such as contained in trona), sodium carbonate, sodium bicarbonate, or combinations thereof. For example, the sodium-containing pH modifier stream may comprise trona in combination with sodium hydroxide. The sodium hydroxide may be at least partially supplied by a recycle stream, as will be discussed below in relation to step 170.

Step 110 may generate sulfuric acid during oxidation of the metal sulfide. Step 120 may in turn generate sodium sulfate from the sodium-containing compounds of the sodium-containing pH modifier stream reacting with the sulfuric acid. The sodium-containing pH modifier stream may also comprise non-sodium-containing compounds that also are pH modifiers, such as, for example, potassium hydroxide, lithium hydroxide, potassium carbonate, potassium bicarbonate, lithium carbonate, lithium bicarbonate, or combinations thereof. When non-sodium-containing compounds are also present, then in addition to sodium sulfate being generated, other alkali metal sulfates may also be generated and mixed with the aqueous sodium sulfate.

Step 130 comprises separating a solid oxidized ore stream containing metal oxides and an aqueous sodium sulfate stream from the oxidizer solution of step 120. Separation may be accomplished using a variety of solid-liquid separation equipment and technologies. For example, thickeners and filters may be used to separate the solid oxidized ore stream from the aqueous sodium sulfate stream. One of ordinary skill in the art, having the benefit of this disclosure, will recognize that the solid-liquid separation may be accomplished a number of ways.

The solid oxidized ore stream may undergo further processing. For example, the solid oxidized ore stream may undergo a cyanide leach process to remove precious metals from the solid metal oxide. In that example, the solid metal oxide may be heaped onto leach pads. One of ordinary skill in the art, having the benefit of this disclosure, will recognize that the solid oxidized ore stream may be further processed in a number of ways.

Step 140 comprises mixing lime with the aqueous sodium sulfate stream, thereby forming sodium hydroxide and calcium sulfate. The chemical reactions may be represented as:

$$Ca(OH)_2 + Na_2SO_4 \rightarrow CaSO_{4(S)} + 2NaOH_{(aq)}$$

The lime may comprise quicklime, slaked lime, dolomitic quicklime, dolomitic slaked lime, or combinations thereof. Mixing lime with the aqueous sodium sulfate stream may comprise mixing a lime slurry with the aqueous sodium sulfate stream. When the lime comprises dolomitic lime, it may be desirable to maintain a pH of about 8 to about 9 while mixing.

The calcium sulfate may comprise gypsum.

In some embodiments, the aqueous sodium sulfate stream, prior to mixing lime therewith, has a neutral pH or an acidic pH. In other embodiments, the aqueous sodium sulfate stream has an alkaline pH, prior to mixing lime therewith.

Step 150 comprises separating a solid calcium sulfate stream from an aqueous sodium hydroxide stream. The separation may be accomplished using a variety of solid-liquid separation equipment and technologies. For example, thickeners, filters, hydrocyclones, centrifuges, and membranes may be used to separate the solid calcium sulfate stream from the aqueous sodium hydroxide stream. One of ordinary skill in the art, having the benefit of this disclosure, will recognize that the solid-liquid separation may be accomplished a number of ways.

When the lime in step 140 comprises dolomitic lime, a suspension of magnesium hydroxide may be maintained in the aqueous sodium hydroxide stream while separating the solid calcium sulfate stream therefrom. Alternatively, the magnesium hydroxide may be removed with the solid calcium sulfate.

Step 160 comprises optionally removing calcium ions from the aqueous sodium hydroxide stream. Removing calcium ions from the aqueous sodium hydroxide stream may comprise mixing carbonate ion-generating compounds with the aqueous sodium hydroxide stream and separating a solid calcium carbonate stream from the aqueous sodium hydroxide stream. Examples of carbonate ion-generating compounds include sodium carbonate, sodium bicarbonate, and trisodium hydrogendicarbonate dihydrate (such as contained in trona). Additionally or alternatively, non-sodium-containing carbonate ion-generating compounds may be used as well, such as, for example, potassium carbonate, potassium bicarbonate, lithium carbonate, and lithium bicarbonate.

Step 160 may further comprise seeding the aqueous sodium hydroxide stream with calcium carbonate crystals. This may increase the size of calcium carbonate crystals formed, which may make filtration and solids removal easier.

Step 170 comprises optionally mixing the aqueous sodium hydroxide stream with the sodium-containing pH modifier stream. Step 170 may be performed in addition to step 160, without step 160, before step 160, or simultaneously with step 160.

Steps 160 and 170 may be performed a number of ways. For example, the sodium-containing pH modifier stream may comprise carbonate ion-generating compounds, such as from trona. A portion of the sodium-containing pH modifier stream (or a supply source thereof) may be mixed with the aqueous sodium hydroxide stream to provide the necessary carbonate ion-generating compounds. In this example, step 160 could be performed prior to step 170.

In another example, all of the sodium-containing pH modifier stream may be mixed with the aqueous sodium hydroxide stream, prior to step 120. In this example, steps 160 and 170 could be performed simultaneously. This could effectively purify and/or enhance the sodium-containing pH modifier stream. For example, when trona is used in the sodium-containing pH modifier stream, insoluble solids and inorganics present in the trona could be removed along with the calcium carbonate, purifying the trona. Additionally, sodium carbonate components of the trona can be reacted with calcium ions to form solid calcium carbonate. A representation of the chemical reaction is as follows:

$$Ca(OH)_2 + Na_2CO_3 \rightarrow 2NaOH + CaCO_{3(s)}$$

Sodium bicarbonate may be used. Sodium carbonate may be more efficacious at modifying pH than the sodium bicarbonate. Therefore, increasing the concentration of sodium carbonate may enhance the sodium-containing pH modifying stream in this example.

Additionally, step 160 and/or step 170 may be performed prior to or simultaneously with step 150. For example, after step 140, step 170 may be performed with the sodium-containing pH modifier stream supplying carbonate ion-generating compounds. Solid calcium carbonate could then be separated from the aqueous sodium hydroxide stream at the same time as the solid calcium sulfate (i.e., step 160 performed at the same time as step 150). In this example, steps 150, 160, and 170 would be performed prior to step 120 (i.e., prior to mixing the sodium-containing pH modifier stream with the oxidizer solution).

In some embodiments, instead of performing optional step 170, all or a portion of the aqueous sodium hydroxide stream is not mixed with the sodium-containing pH modifier stream. Instead, all or a portion of the aqueous sodium hydroxide stream is used in a different process, such as a process related to the recovery of precious metals, but not specifically involved in the oxidation of sulfides.

One of ordinary skill in the art, having the benefit of this disclosure, will recognize that the steps of the process 100 may be performed non-sequentially and in a number of different orders. Additionally, the process 100 may include steps not shown in FIG. 2. Processes with any sub-combination of the steps of FIG. 2 are also within the scope of this disclosure.

Figure 3:
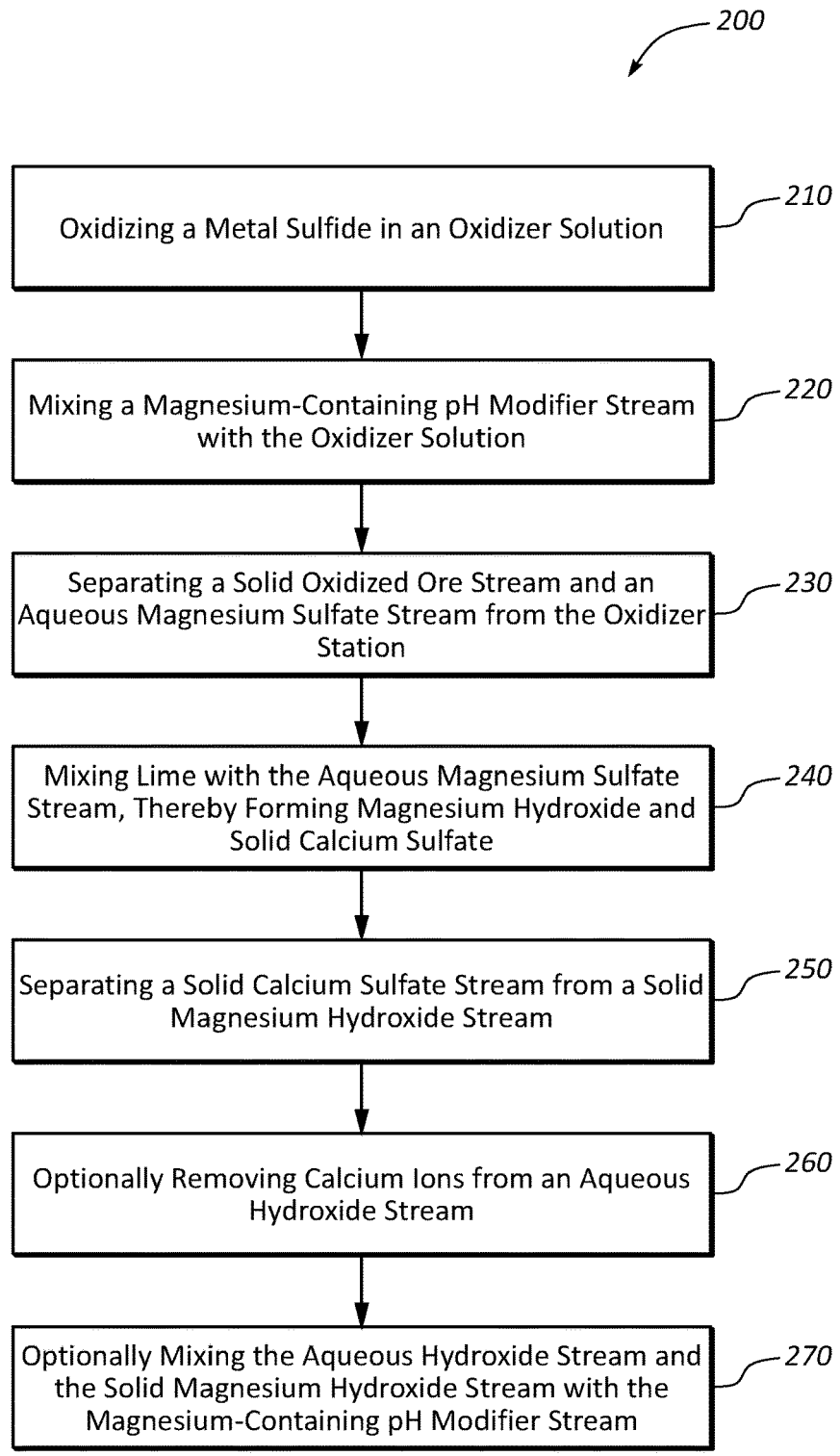
FIG. 3 illustrates another embodiment of a process for regenerating alkali streams.

FIG. 3 illustrates one embodiment of a process 200 for regenerating alkali streams. The process 200 encompasses specific embodiments of the steps of the process 1. The process 200 disclosure applies to the process 1 as well, but does not limit it. In particular, the disclosure relating to the process 200 steps applies to the process 1 steps with similar numbers. Likewise, similar disclosure in the process 100 applies to the process 200, but does not limit it.

Step 210 of the process 200 comprises oxidizing a metal sulfide in an oxidizer solution. As with step 110 of the process 100, the oxidizing process may be continuous, a semi-batch process, or a batch process. The oxidizing may be conducted at atmospheric pressure or increased pressure.

The oxidizing may be conducted at ambient temperature or higher. The oxidizing may be conducted under acidic or alkaline conditions.

Step 220 comprises mixing a magnesium-containing pH modifier stream with the oxidizer solution of step 210. The magnesium-containing pH modifier stream may be used to control the pH of the oxidizer solution. The magnesium-containing pH modifier stream may comprise, for example, magnesium hydroxide, magnesium carbonate, or combinations thereof. The magnesium hydroxide may be at least partially supplied by a recycle stream, as will be discussed below in relation to step 270.

Step 210 may generate sulfuric acid during oxidation of the metal sulfide. Step 220 may in turn generate magnesium sulfate from the magnesium-containing compounds of the magnesium-containing pH modifier stream reacting with the sulfuric acid. The magnesium-containing pH modifier stream may also comprise non-magnesium-containing compounds that also are pH modifiers, such as, for example, trona, sodium hydroxide, potassium hydroxide, lithium hydroxide, potassium carbonate, potassium bicarbonate, lithium carbonate, lithium bicarbonate, or combinations thereof. When non-magnesium-containing compounds are also present, then in addition to magnesium sulfate being generated, other alkali metal and alkali earth metal sulfates may also be generated and mixed with the aqueous magnesium sulfate.

Step 230 comprises separating a solid oxidized ore stream containing metal oxides and an aqueous magnesium sulfate stream from the oxidizer solution of step 220. Separation may be accomplished using a variety of solid-liquid separation equipment and technologies, as discussed in step 130 of the process 100. Additionally, the solid oxidized ore stream may undergo further processing as discussed in the process 100.

Step 240 comprises mixing lime with the aqueous magnesium sulfate stream, and magnesium hydroxide and calcium sulfate would thereby be formed. The lime may comprise quicklime, slaked lime, dolomitic quicklime, dolomitic slaked lime, or combinations thereof. Mixing lime with the aqueous magnesium sulfate stream may comprise mixing a lime slurry with the aqueous magnesium sulfate stream. The calcium sulfate may comprise gypsum.

In some embodiments, the aqueous magnesium sulfate stream, prior to mixing lime therewith, has a neutral pH or an acidic pH. In other embodiments, the magnesium sulfate stream has an alkaline pH, prior to mixing lime therewith.

Step 250 comprises separating a solid calcium sulfate stream from a solid magnesium hydroxide stream. The separation may be accomplished using a variety of solid-solid separation equipment and technologies, such as, for example, filters, sieves, hydrocyclones, centrifuges, and membranes. One of ordinary skill in the art, having the benefit of this disclosure, will recognize that the solid-solid separation may be accomplished a number of ways.

When the lime in step 240 comprises dolomitic lime, a suspension of magnesium hydroxide may be maintained in an aqueous stream while separating the solid calcium sulfate stream therefrom. Alternatively, the magnesium hydroxide may be removed with the solid calcium sulfate and later separated.

Step 260 comprises optionally removing calcium ions from the aqueous hydroxide stream. The aqueous hydroxide stream may comprise aqueous sodium hydroxide as well as aqueous magnesium hydroxide, if sodium ions are present earlier in the process. Removing calcium ions from the aqueous hydroxide stream may comprise mixing carbonate ion-generating compounds with the aqueous hydroxide stream and separating a solid calcium carbonate stream from the aqueous hydroxide stream. Examples of carbonate ion-generating compounds include sodium carbonate, sodium bicarbonate, and trisodium hydrogendicarbonate dihydrate (such as contained in trona). Additionally or alternatively, non-sodium-containing carbonate ion-generating compounds may be used as well, such as, for example, potassium carbonate, potassium bicarbonate, lithium carbonate, and lithium bicarbonate.

Step 260 may further comprise seeding the aqueous hydroxide stream with calcium carbonate crystals. This may increase the size of calcium carbonate crystals formed, which may make filtration and solids removal/separation easier.

Step 270 comprises optionally mixing the aqueous hydroxide stream and the solid magnesium hydroxide stream with the magnesium-containing pH modifier stream. Step 270 may be performed in addition to step 260, without step 260, before step 260, or simultaneously with step 260.

Steps 260 and 270 may be performed a number of ways. For example, the magnesium-containing pH modifier stream may comprise carbonate ion-generating compounds, such as from trona. A portion of the magnesium-containing pH modifier stream (or a supply source thereof) may be mixed with the aqueous hydroxide stream to provide the necessary carbonate ion-generating compounds. In this example, step 260 could be performed prior to step 270.

In some embodiments, instead of performing optional step 270, all or a portion of the aqueous hydroxide stream is not mixed with the magnesium-containing pH modifier stream. Instead, all or a portion of the aqueous hydroxide stream is used in a different process, such as a process related to the recovery of precious metals, but not specifically involved in the oxidation of sulfides. Likewise, the same alternatives apply to use of the solid magnesium hydroxide stream.

One of ordinary skill in the art, having the benefit of this disclosure, will recognize that the steps of the process 200 may be performed non-sequentially and in a number of different orders. Additionally, the process 200 may include steps not shown in FIG. 3. Processes with any sub-combination of the steps of FIG. 3 are also within the scope of this disclosure.

Figure 4:
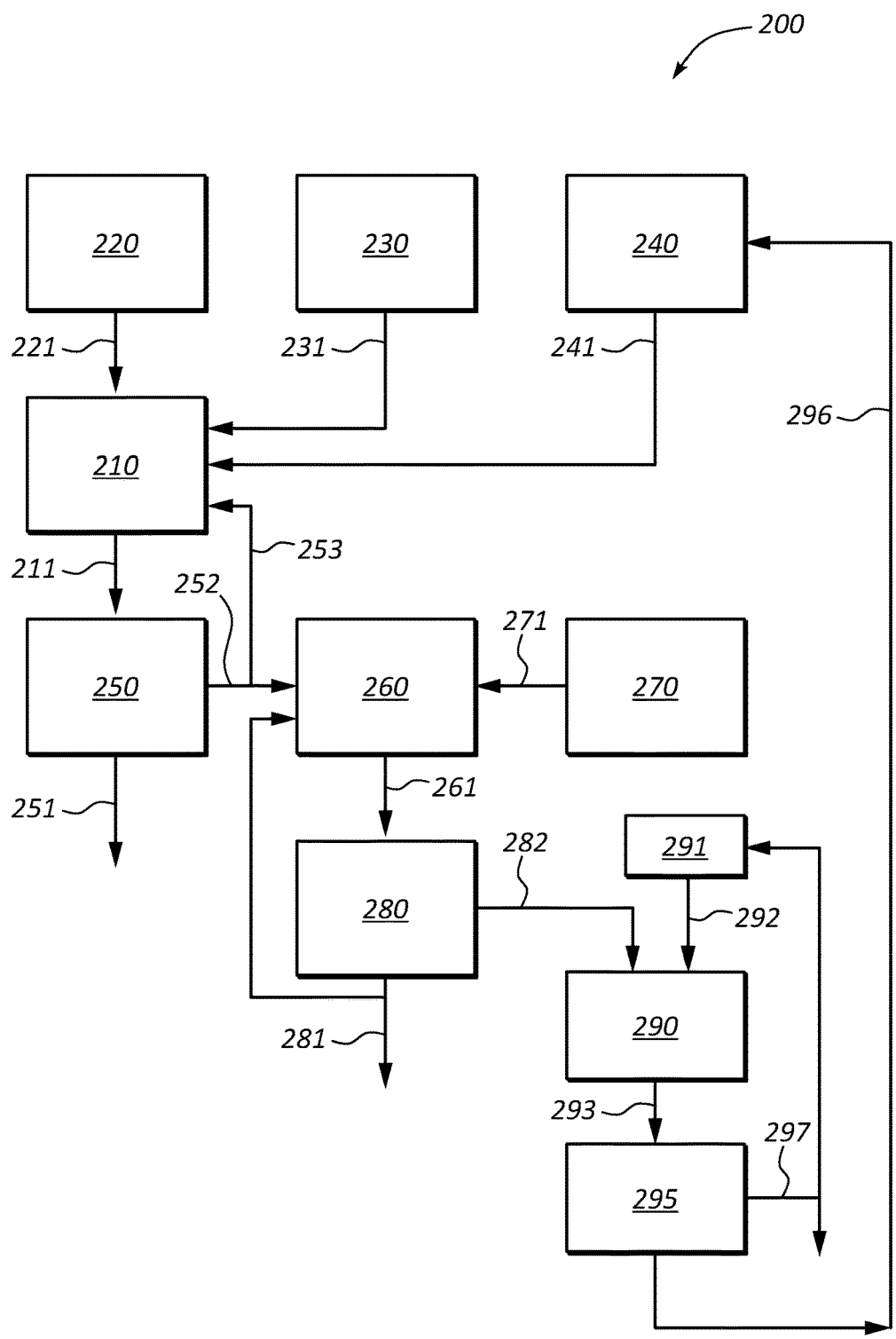
FIG. 4 illustrates one embodiment of a system for regenerating alkali streams.

FIG. 4 illustrates one embodiment of a system 200 for regenerating alkali streams. The system 200 encompasses specific embodiments of the process 100. The system 200 disclosure applies to the process 100 as well, but does not limit it.

The system 200 comprises an oxidizer system 210 in communication with an ore supply system 220, an oxidizing agent supply system 230, and a pH modifier supply system 240. The oxidizer system 210 may be configured to oxidize sulfidic ore. The oxidizer system 210 may comprise an oxidizer vessel. The oxidizer vessel may be configured to operate under alkaline or acidic conditions. For example, the oxidizer vessel may be configured to operate under alkaline conditions at a pH greater than about 8, greater than about 9, or greater than about 10.

The oxidizer vessel may be configured to operate at a variety of temperatures. The oxidizer vessel may be configured to operate at about ambient temperatures or higher (e.g., about 10° C. to about 300° C.). In some embodiments, the oxidizer vessel may be configured to operate at about 20° C. to about 80° C., such as about 20° C. to about 50° C.

The oxidizer vessel may be configured to operate at a variety of pressures. The oxidizer vessel may be configured to operate at about ambient pressure or higher (e.g., about 1 bar to about 30 bar).

The ore supply system 220 comprises an ore feed 221 configured to supply ore to the oxidizer system 210. The ore feed 221 may be configured to supply ore in a number of forms, such as, by way of non-limiting example, raw ore, milled ore, flotation concentrate, and flotation tailings. One of ordinary skill in the art, having the benefit of this disclosure, will recognize that the ore feed 221 may be configured to operate in a number of forms and ways.

The oxidizing agent supply system 230 comprises an oxidizing agent feed 231 configured to supply oxidizing agent to the oxidizer system 210. The oxidizing agent feed 231 may be configured to supply oxidizing agents in a number of forms, such as, by way of non-limiting example, a gas. For example, the oxidizing agent feed 231 may be configured to supply oxygen gas, air, or combinations thereof. One of ordinary skill in the art, having the benefit of this disclosure, will recognize that the oxidizing agent feed 231 may be configured to supply oxidizing agents in a number of forms and ways.

The oxidizing agent supply system 230 may be configured to operate at atmospheric pressure or higher. For example, the oxidizing agent feed 231 may be configured to pressurize the oxidizer system 210 with oxygen and/or air gas. Alternatively, the oxidizing agent feed 231 may be configured to supply oxygen and/or air gas at about atmospheric pressure.

The pH modifier supply system 240 comprises a pH modifier feed 241 configured to supply sodium-containing pH modifier to the oxidizer system 210. The sodium-containing pH modifier may comprise, by way of non-limiting example, sodium hydroxide, trisodium hydrogendicarbonate dihydrate (such as contained in trona), sodium carbonate, sodium bicarbonate, or combinations thereof. For example, the sodium-containing pH modifier stream may comprise trona in combination with sodium hydroxide. The sodium hydroxide may be at least partially supplied by a recycle stream, as will be discussed below in relation to a regeneration system 260.

The pH modifier feed 241 may be configured to supply the pH modifier in a number of forms, such as, by way of non-limiting example, in powder form or as aqueous solution or suspension. One of ordinary skill in the art, having the benefit of this disclosure, will recognize that the pH modifier feed 241 may be configured to operate in a number of forms and ways.

The oxidizer system 210 comprises an oxidized product stream 211. The oxidized product stream 211 is configured to convey oxidized ore and aqueous sodium sulfates away from the oxidizer vessel.

A first separation system 250 is configured to receive oxidized product stream 211 and is configured to separate solid oxidized ore from liquid aqueous sodium sulfates. The first separation system 250 may comprise a settling tank, a thickener, hydrocyclone, a filter (such as a vacuum filter), or other solid-liquid separation equipment, alone or in combination. One of ordinary skill in the art, having the benefit of this disclosure, will recognize that the first separation system 250 may involve a number of different separation technologies.

The first separation system 250 comprises an oxidized ore stream 251 configured to convey solid oxidized ore. "Oxidized ore," as used herein, refers to ore that contains oxidized compounds, such as metal sulfides oxidized to metal oxides. The oxidized ore stream 251 may be configured to convey the oxidized ore to other locations for further processing. Examples of further processing are discussed above in relation to process 100 and the solid metal oxide of step 130.

The first separation system 250 comprises a liquid stream 252 configured to convey liquids separated from the oxidized ore. The liquid stream 252 is configured to convey liquids comprising aqueous sodium sulfate to the regeneration system 260. An optional liquid recycle stream 253 diverges from the liquid stream 252 and is configured to return a portion of the liquids back to the oxidizer system 210. The liquid recycle stream 253 may not be present, in which case, all of the liquids are conveyed to the regeneration system 260.

The regeneration system 260 is in communication with a lime supply system 270. The regeneration system 260 is configured to react aqueous sodium sulfates with calcium hydroxide and thereby form solid calcium sulfate and aqueous sodium hydroxide (see, for example, step 140 of the process 100 discussed above). The regeneration system 260 may comprise a regeneration vessel configured to mix lime with the aqueous sodium sulfate. For example, the regeneration vessel may comprise static or active mixers. The regeneration vessel may be configured to maintain a specific pH, such as, for example, about 10 to about 11, such as when dolomitic lime is used, or about 12 to about 13, such as when high-calcium lime is used.

The lime supply system 270 comprises a lime feed 271. The lime feed 271 may be configured to supply solid lime or aqueous lime. The lime feed 271 may be configured to convey quicklime, slaked lime, dolomitic lime, or combinations thereof. Of course, in an aqueous slurry, any calcium oxide would react with water to form calcium hydroxide. Magnesium oxide, in an aqueous slurry, may eventually be converted to magnesium hydroxide, depending on the amount of time the magnesium oxide particles are exposed to water and the temperature and pressure conditions.

The regeneration system 260 comprises a regenerated product stream 261 configured to convey aqueous sodium hydroxide and solid calcium sulfates to a second separation system 280. The second separation system 280 is configured to separate the solid calcium sulfate from the aqueous sodium hydroxide. The second separation system 280 comprises a solid stream 281 and a liquid stream 282. The solid stream 281 is configured to convey solids that have been separated out. The solids will comprise calcium sulfate, such as gypsum. The solid calcium sulfate may be disposed of, sold, further processed, or handled in some other way. A portion of the calcium sulfate solids in solid stream 281 can be optionally recycled back to the regeneration system 260 as seeds so that larger calcium sulfate crystals can be grown. This could enhance the solid-liquid separation in the second separation system 280. The liquid stream 282 is configured to convey separated liquids to a calcium removal system 290. The second separation system 280 may comprise thickeners, clarifiers, filters, hydrocyclones, centrifuges, and membranes, alone or in combination. One of ordinary skill in the art, having the benefit of this disclosure, will recognize that the solid-liquid separation may be accomplished a number of ways.

The calcium removal system 290 may comprise a calcium removal vessel configured to mix carbonate ion-generating compounds with aqueous sodium hydroxide and precipitate calcium carbonate out of the liquid, thereby purifying the aqueous sodium hydroxide (see, for example, step 160 of the process 100 discussed above). The calcium removal vessel may comprise static or active mixers. The calcium removal system 290 may be configured to seed the calcium removal vessel with calcium carbonate crystals. This could enhance the solid-liquid separation in the calcium removal system 290.

The calcium removal system 290 comprises a carbonate supply 291 and a carbonate feed 292. The carbonate supply 291 may be configured to supply carbonate ion-generating compounds, such as, for example, sodium carbonate, sodium bicarbonate, trisodium hydrogendicarbonate dihydrate (such as contained in trona), or combinations thereof. The carbonate supply 291 may be supplied from a separate source or may be supplied from the pH modifier supply system 240. For example, when the pH modifier supply system 240 is configured to only supply sodium hydroxide, then a separate source of carbonate ion-generating compounds is required for the carbonate supply 291. However, when the pH modifier supply system 240 is configured to at least partially supply carbonate ion-generating compounds, then the carbonate supply 291 may be supplied by the pH modifier supply system 240 (such as via the pH modifier feed 241).

The calcium removal system 290 comprises a product stream 293 configured to convey precipitated calcium carbonate and aqueous sodium hydroxide to a third separation system 295.

The third separation system 295 is configured to separate solid calcium carbonate from the aqueous sodium hydroxide. The disclosure herein regarding other solid-liquid separations applies to the third separation system 295 as well. The third separation system 295 comprises a purified liquid stream 296 and a solid stream 297. The purified liquid stream 296 is configured to convey purified aqueous sodium hydroxide to the pH modifier supply system 240, which may in turn reuse the sodium hydroxide. At steady-state operation of the system 200, the purified liquid stream 296 is a recycle stream. The solid stream 297 is configured to convey solids that have been separated out. The solids will comprise calcium carbonate. A portion of the solid stream 297 may be mixed with the carbonate supply 291 and recycled as calcium carbonate seed. The solid calcium carbonate may be disposed of, sold, further processed, or handled in some other way.

In some embodiments, the second separation system 280 is not present and the regenerated product stream 261 feeds directly into the calcium removal system 290. In that embodiment, solid calcium sulfate is separated along with solid calcium carbonate by the third separation system 295.

In some embodiments, the second separation system 280 and/or the third separation system 295 are configured to maintain magnesium hydroxide solids suspended in the aqueous sodium hydroxide stream while separating out other solids, including calcium sulfate and calcium carbonate. For example, one or both of the separation systems may comprise a hydrocyclone or centrifuge configured, structured, and located to maintain magnesium hydroxide solids suspended in the aqueous sodium hydroxide stream while separating out other solids.

In some embodiments, the regeneration system 260 and the second separation system 280 are combined into a single unit operation, such that solids are removed as they are precipitated out of solution. For example, depending on the process conditions of the regeneration system 260, it may be desirable to extract calcium sulfate as it is precipitated to favor progress of the reaction towards calcium sulfate generation. This may be beneficial when the calcium hydroxide is maintained in solution.

In some embodiments, the lime feed 271 supplies finely divided lime (either as a slurry or as a powder) to the regeneration system 260. In such embodiments, the calcium hydroxide in the lime may not fully dissolve. Therefore, both solid calcium hydroxide and solid calcium sulfate may be present in the regeneration system 260. In that situation, the process conditions may be controlled to drive production of large calcium sulfate particles (relative to the size of the supplied calcium hydroxide particles), such as via the seed process disclosed above. The second separation system 280 (or an additional intermediate separation system) may then be configured to separate primarily calcium hydroxide particles from the generally larger calcium sulfate particles. The separated calcium hydroxide particles may then be recycled back to the regeneration system 260 and the calcium sulfate particles further processed, used for seeding, and/or disposed of.

In some embodiments, the calcium removal system 290 and the third separation system 295 are combined into a single unit operation. Furthermore, in some embodiments, the regeneration system 260, the second separation system 280, the calcium removal system 290, and the third separation system 295 are all combined into a single unit operation. One of ordinary skill in the art, having the benefit of this disclosure, will recognize that a number of modifications may be made to the system 200.

Figure 5:
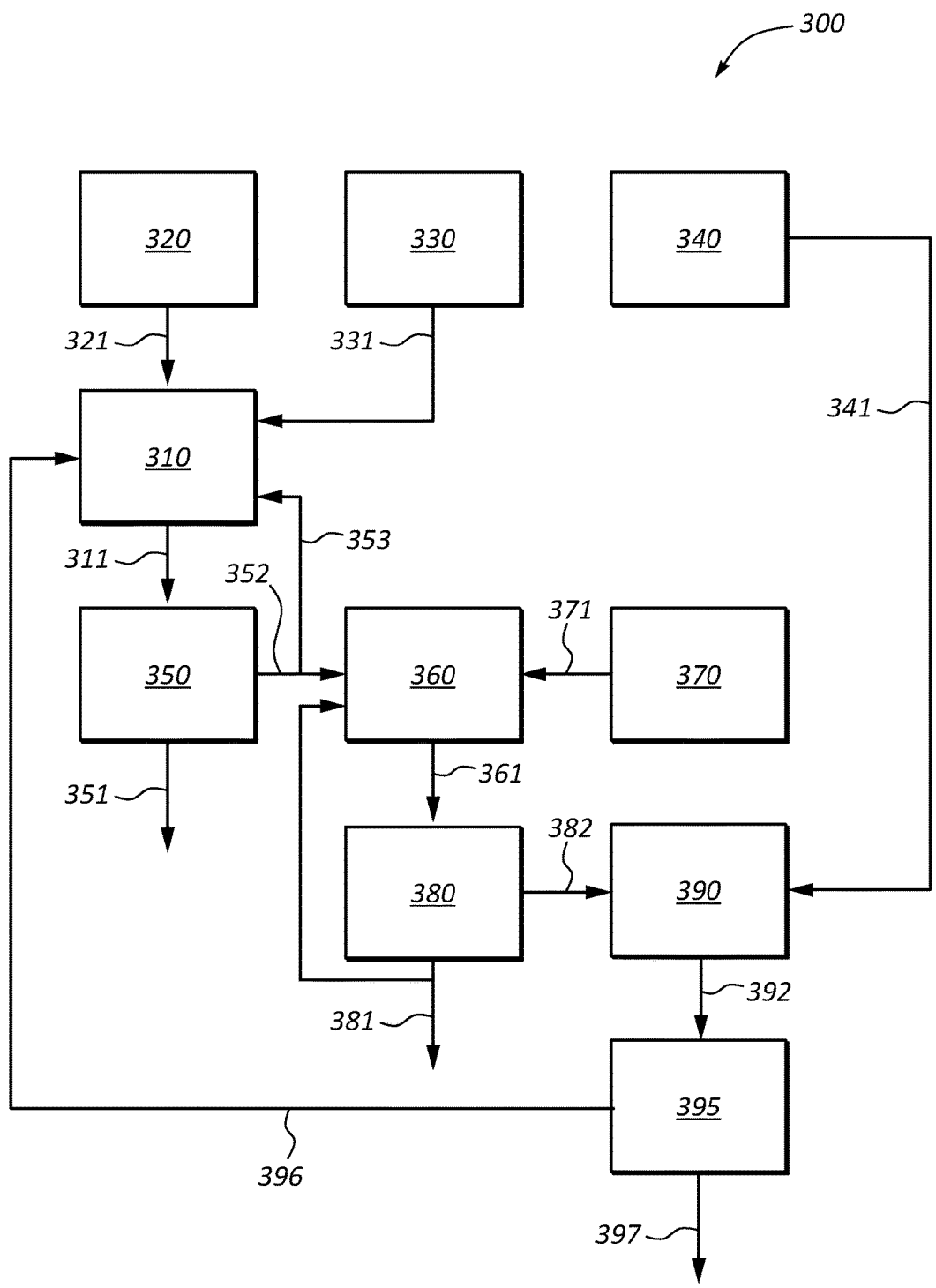
FIG. 5 illustrates another embodiment of a system for regenerating alkali streams.

FIG. 5 illustrates one embodiment of a system 300 for regenerating alkali streams. The system 300 encompasses a variation of the system 200.

The system 300 does not have an equivalent to the carbonate feed stream 291 of the system 200. Instead, a pH modifier feed 341 is configured to directly feed to a calcium removal system 390, instead of feeding directly to the oxidizer system 210. In the system 300, the entire pH modifier supplied by a pH modifier supply system 340 is directed to the calcium removal system 390. Additionally, the pH modifier feed 341 is configured to convey carbonate ion-generating compounds, instead of optionally so, as in the system 200.

The calcium removal system 390 may purify and enhance the pH modifier feed 341. For example, when trona is at least a partial source of the pH modifier, insoluble inorganics present in the trona could be removed, thereby purifying the trona. Likewise, as calcium is removed from the aqueous sodium hydroxide stream (see, for example, step 160 of the process 100 discussed above) by reaction with sodium bicarbonate, the sodium carbonate content is increased, thereby enhancing the trona. A third separation system 395 comprises a purified liquid stream 396 and a solid stream 397, as in the system 200. However, the purified liquid stream 396 directly feeds into an oxidizer system 310, instead of indirectly via the pH modifier supply system 340, as in the system 200.

At steady-state, the mass flowrate of the purified liquid stream 396 will likely be greater than the mass flowrate of the pH modifier feed 341 due to addition from a lime feed 371. The purified liquid stream 396 will include recycled aqueous sodium hydroxide.

Unless specifically differentiated, the above disclosure regarding the system 200 components and systems applies to the system 300 components and systems with like numbers.

Figure 6:
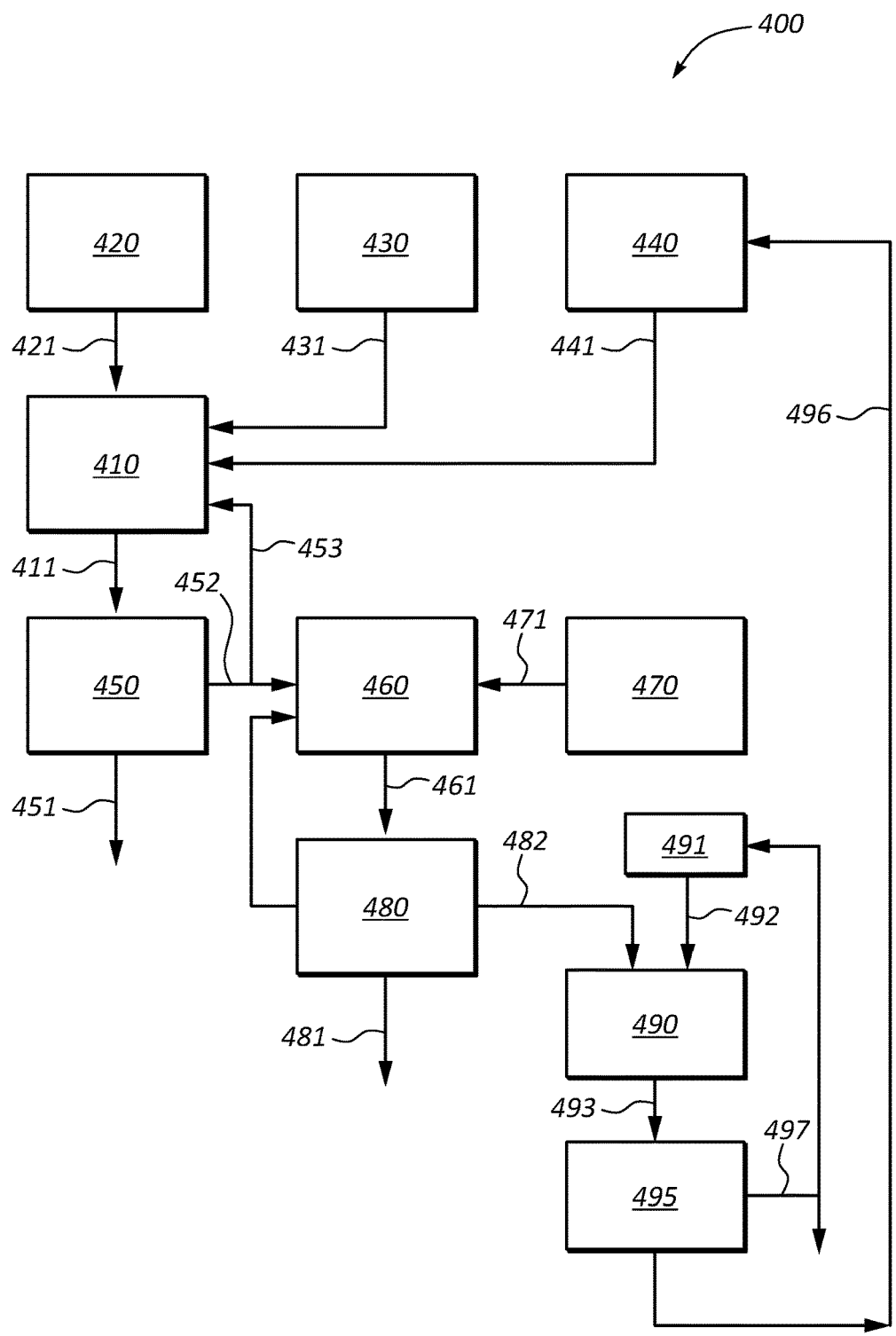
FIG. 6 illustrates another embodiment of a system for regenerating alkali streams.

FIG. 6 illustrates one embodiment of a system 400 for regenerating alkali streams. The system 400 encompasses specific embodiments of the process 200. The system 400 disclosure applies to process 200 as well, but does not limit it.

The system 400 comprises an oxidizer system 410 in communication with an ore supply system 420, an oxidizing agent supply system 430, and a pH modifier supply system

440. The oxidizer system 410 may be configured to oxidize sulfidic ore. The ore supply system 420 comprises an ore feed 421 configured to supply ore to the oxidizer system 410. The oxidizing agent supply system 430 comprises an oxidizing agent feed 431 configured to supply oxidizing agent to the oxidizer system 410. The pH modifier supply system 440 comprises a pH modifier feed 441 configured to supply a pH modifier to the oxidizer system 410. The above disclosure regarding structural features of the system 200 applies equally to the oxidizer system 410, the ore supply system 420, the oxidizing agent supply system 430, and the pH modifier supply system 440.

In the system 200 and the system 300, magnesium hydroxide may optionally be present in the pH modifier. By contrast, the system 400 requires the presence of magnesium hydroxide (or oxide) in the pH modifier. The pH modifier of the system 400 may optionally include sodium-containing pH modifiers such as sodium hydroxide, trisodium hydrogendicarbonate dihydrate (such as contained in trona), sodium carbonate, sodium bicarbonate, or combinations thereof. The magnesium hydroxide may be at least partially supplied by a recycle stream, as will be discussed below in relation to a regeneration system 460. The magnesium hydroxide (or oxide) reacts with sulfuric acid (generated by oxidation) to form aqueous magnesium sulfate.

In the system 400, an oxidized product stream 411 is configured to convey oxidized ore and aqueous sulfates away from the oxidizer vessel. In the system 400, the aqueous sulfates include magnesium sulfates and may include sodium sulfates.

A first separation system 450 is configured to receive the oxidized product stream 411 and is configured to separate solid oxidized ore from liquid aqueous sulfates. The first separation system 450 comprises an oxidized ore stream 451 configured to convey solid oxidized ore. The first separation system 450 comprises a liquid stream 452 configured to convey liquids separated from the oxidized ore. The liquid stream 452 is configured to convey liquids comprising aqueous sulfate to the regeneration system 460. An optional liquid recycle stream 453 diverges from the liquid stream 452 and is configured to return a portion of the liquids back to the oxidizer system 410. The liquid recycle stream 453 may not be present, in which case, all of the liquids are conveyed to the regeneration system 460. The above disclosure regarding potential structural features of the first separation system 250 applies equally to the first separation system 450.

The regeneration system 460 is in communication with a lime supply system 470. The regeneration system 460 is configured to react aqueous sulfates with dolomitic lime and thereby form solid sulfate and hydroxide. The above disclosure regarding potential structural features of the regeneration system 260 applies equally to the regeneration system 460.

The lime supply system 470 comprises a lime feed 471. The lime feed 471 may be configured to supply solid lime or aqueous lime. The lime feed 271 will generally be configured to supply dolomitic lime. The dolomitic lime, whether quicklime or slaked, often has a calcium-to-magnesium weight ratio of about 5:3.

In contrast to the system 200 that, in certain embodiments, can regenerate sodium hydroxide, the system 400, in certain embodiments, can regenerate primarily magnesium hydroxide. For example, calcium hydroxide in the dolomitic lime may react with magnesium sulfate according to the following generalized reaction.

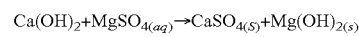

$$Ca(OH)_2 + MgSO_{4(aq)} \rightarrow CaSO_{4(S)} + Mg(OH)_{2(s)}$$

Once the magnesium sulfate is consumed the pH may go up, if excess calcium hydroxide is present. If sodium sulfate is also present (such as if a sodium-containing pH modifier were present in the pH modifier feed 441), then the following generalized reaction may also occur, depending on the process conditions.

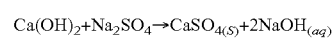

$$Ca(OH)_2 + Na_2SO_4 \rightarrow CaSO_{4(S)} + 2NaOH_{(aq)}$$

Removal of calcium sulfate from the regeneration system 460 may facilitate progress of the reaction. Separation of solid calcium hydroxide from solid calcium sulfate (as disclosed above) may be desirable. Likewise, with the magnesium sulfate consumed, if excess calcium hydroxide is present and sodium carbonate is present (such as if trona were present in the pH modifier feed 441), then the following generalized reaction may also occur.

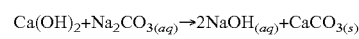

$$Ca(OH)_2 + Na_2CO_{3(aq)} \rightarrow 2NaOH_{(aq)} + CaCO_{3(s)}$$

Depending on the pH of liquor in the regeneration system 460, the magnesium hydroxide (and oxide) introduced to the regeneration system 460 as part of the dolomitic lime may be partially reacted in the regeneration system 460. This may lead to a buildup of magnesium hydroxide in the system 400. This will be discussed more below. To achieve more complete consumption of the magnesium sulfate, it may be beneficial to operate the regeneration system 460 as a batch or semi-batch process.

The regeneration system 460 comprises a regenerated product stream 461 configured to convey aqueous magnesium hydroxide and solid calcium sulfates (and solid calcium carbonates if present) to a second separation system 480. The second separation system 480 is configured to separate the solid calcium sulfate from the aqueous magnesium hydroxide. The second separation system 480 comprises a solid stream 481 and a liquid stream 482. The solid stream 481 is configured to convey solids that have been separated out. The solids may comprise calcium sulfate, such as gypsum. The solid calcium sulfate may be disposed of, sold, further processed, or handled in some other way. The liquid stream 482 is configured to convey separated liquids to an optional calcium removal system 490. The above disclosure regarding potential structural features of the second separation system 280 applies equally to the second separation system 480.

The optional calcium removal system 490 may comprise a calcium removal vessel configured to mix carbonate ion-generating compounds with aqueous magnesium hydroxide (and sodium hydroxide if present) and precipitate calcium carbonate out of the liquid, thereby purifying the aqueous magnesium hydroxide.

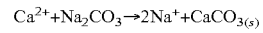

$$Ca^{2+} + Na_2CO_3 \rightarrow 2Na^+ + CaCO_{3(s)}$$

The above disclosure regarding potential structural features of the calcium removal system 290 applies equally to the calcium removal system 490.

The calcium removal system 490 comprises a carbonate supply 491 and a carbonate feed 492. The carbonate supply 491 may be configured to supply carbonate ion-generating compounds, such as, for example, sodium carbonate, sodium bicarbonate, trisodium hydrogendicarbonate dihydrate (such as contained in trona), or combinations thereof. The carbonate supply 491 may be supplied from a separate source or may be supplied from the pH modifier supply system 440. For example, when the pH modifier supply system 440 is configured to only supply magnesium hydroxide, then a separate source of carbonate ion-generating compounds is required for the carbonate supply 491. However, when the pH modifier supply system 440 is configured to at least partially supply carbonate ion-generating compounds, then the carbonate supply 491 may be supplied by the pH modifier supply system 440 (such as via the pH modifier feed 441).

The calcium removal system 490 comprises a product stream 493 configured to convey precipitated calcium carbonate and aqueous magnesium hydroxide and sodium hydroxide to a third separation system 495.

The third separation system 495 (which may not be present if the calcium removal system 490 is not present) is configured to separate solid calcium carbonate from the aqueous magnesium hydroxide and sodium hydroxide. The disclosure herein regarding structural features of the other solid-liquid separations applies to the third separation system 495 as well. The third separation system 495 comprises a purified liquid stream 496 and a solid stream 497. The purified liquid stream 496 is configured to convey purified aqueous magnesium hydroxide and sodium hydroxide to the pH modifier supply system 440, which may in turn reuse the hydroxides.

At steady-state operation of the system 400, the purified liquid stream 496 is both a recycle stream and source of input of fresh magnesium hydroxide for the oxidizer system 410. The solid stream 497 is configured to convey solids that have been separated out. The solids may comprise calcium carbonate. A portion of the solid stream 497 may be mixed with the carbonate supply 491 and recycled as calcium carbonate seed. The solid calcium carbonate may be disposed of, sold, further processed, or handled in some other way.

One of the benefits of the system 400 is that magnesium hydroxide (and/or oxide) is circulated for use as a pH modifier, and may primarily be the pH modifier. This may have oxidation benefits over primarily sodium-containing pH modifiers.

In some embodiments where magnesium hydroxide is primarily the pH modifier, prior to steady-state operation, it may be beneficial to initially use a sodium-containing pH modifier, such as a trona or sodium hydroxide. During startup, when magnesium hydroxide has not yet been introduced into the system via the dolomitic lime, the sodium-containing pH modifier can be used to generate sodium sulfates. As the dolomitic lime and sodium sulfates react in the regeneration system 460, then magnesium hydroxide is introduced to the system. As magnesium hydroxide builds up in the system (from fresh dolomitic lime and regeneration from magnesium sulfate), then the introduction of the sodium-containing pH modifier can be reduced and/or eliminated.

In some embodiments, during steady-state operation, magnesium hydroxide will buildup in the system as a result of inputs from fresh dolomitic lime and as a result of regeneration from magnesium sulfate. One approach is to prevent the buildup by continuously removing magnesium hydroxide, such as solid magnesium hydroxide, from the system. For example, one of the existing or additional separation systems may be used to separate solid magnesium hydroxide from the aqueous magnesium hydroxide (and sodium hydroxide, if present). Likewise, another approach is to remove magnesium hydroxide (either aqueous or solid) from the system at particular concentration limits.

Another approach is to switch to primarily high-calcium lime in the lime feed 471 after the desired magnesium hydroxide concentration has been achieved. For example, once the desired magnesium hydroxide concentration has been achieved, then slaked lime comprising primarily calcium hydroxide can be used. The calcium hydroxide would regenerate the magnesium hydroxide. Make-up dolomitic lime could continue to be incorporated with the slaked lime as needed.

In some embodiments, the calcium removal system 490 and the third separation system 495 are not present. Instead, after the magnesium sulfate has been largely consumed in the reaction vessel of the regeneration system 460, carbonate ion-generating compounds can be introduced to consume the remaining calcium ions and generate solid calcium carbonate. The solid calcium carbonate can then be removed with the solid calcium sulfate.

In some embodiments, the second separation system 480 and/or the third separation system 495 are configured to maintain magnesium hydroxide solids suspended in the aqueous magnesium hydroxide (and aqueous sodium hydroxide, if present) stream while separating out other solids, including calcium sulfate and calcium carbonate. For example, one or both of the separation systems may comprise a hydrocyclone or centrifuge configured, structured, and located to maintain magnesium hydroxide solids suspended in the aqueous hydroxide stream while separating out other solids.

In some embodiments, the calcium removal system 490 and the third separation system 495 are combined into a single unit operation. Furthermore, in some embodiments, the regeneration system 460, the second separation system 480, the calcium removal system 490, and the third separation system 495 are all combined into a single unit operation. One of ordinary skill in the art, having the benefit of this disclosure, will recognize that a number of modifications may be made to the system 400.

EXAMPLES

Equipment and reagent list:

ICP Spectrometer; Perkin Elmer 7300V pH Meter; Orion 920A+

Syringe Filters; 0.45 μm

Transfer Pipet; 5 mL tip

Liquid Calibration standards Ca, Mg, Na and S; 1000 ppm

Magnesium Sulfate (Epsom Salt)

Sodium Sulfate; Reagent Grade

Sodium Bicarbonate (Arm & Hammer® baking soda)

High-Calcium Quicklime—Obtained from Cricket Mountain Lime Plant, Delta, Utah.

Dolomitic Quicklime—Obtained from Cricket Mountain Lime Plant, Delta, Utah.

Chemical analysis of quicklimes used:

TABLE 1

| Sample Type | CaO (%) | MgO (%) | $Fe_2O_3$ (%) | $Al_2O_3$ (%) | SrO (ppm) | MnO (ppm) | $SiO_2$ (%) | BaO (ppm) | $K_2O$ (ppm) | $Na_2O$ (ppm) | $P_2O_5$ (ppm) | $TiO_2$ (ppm) | ICP Total |
|---|---|---|---|---|---|---|---|---|---|---|---|---|---|
| High-Calcium Quicklime | 93.95 | 1.46 | 0.19 | 0.42 | 604 | 58 | 1.54 | 18 | 531 | 276 | <100 | 187 | 97.7 |
| Dolomitic Quicklime | 57.94 | 40.00 | 0.37 | 0.18 | 68 | 558 | 0.50 | 7 | 94 | 105 | <100 | 106 | 98.7 |

Example 1

A starting solution of $Na_2SO_4$ (25.01 g), $MgSO_4$ (as buffering agent—37.09 g as $MgSO_4.7H_2O$) and $NaHCO_3$ (5 g) in 500 mL of water was made. This solution was heated to 70° C. To this initial mixture were added a 2.5%, by oxide weight, lime slurry ("Milk"). The lime slurry was a mixture of high-calcium and dolomitic lime (90%/10% respectively). For each step in the reaction, 5 mL of the lime slurry was added and then a 5 mL sample was removed out of the reaction solution for ICP testing. The 5 mL samples pulled from the reaction were filtered through a 0.45 μm syringe filter prior to running on the ICP. The ICP was calibrated with liquid calibration standards.

Figure 7B:
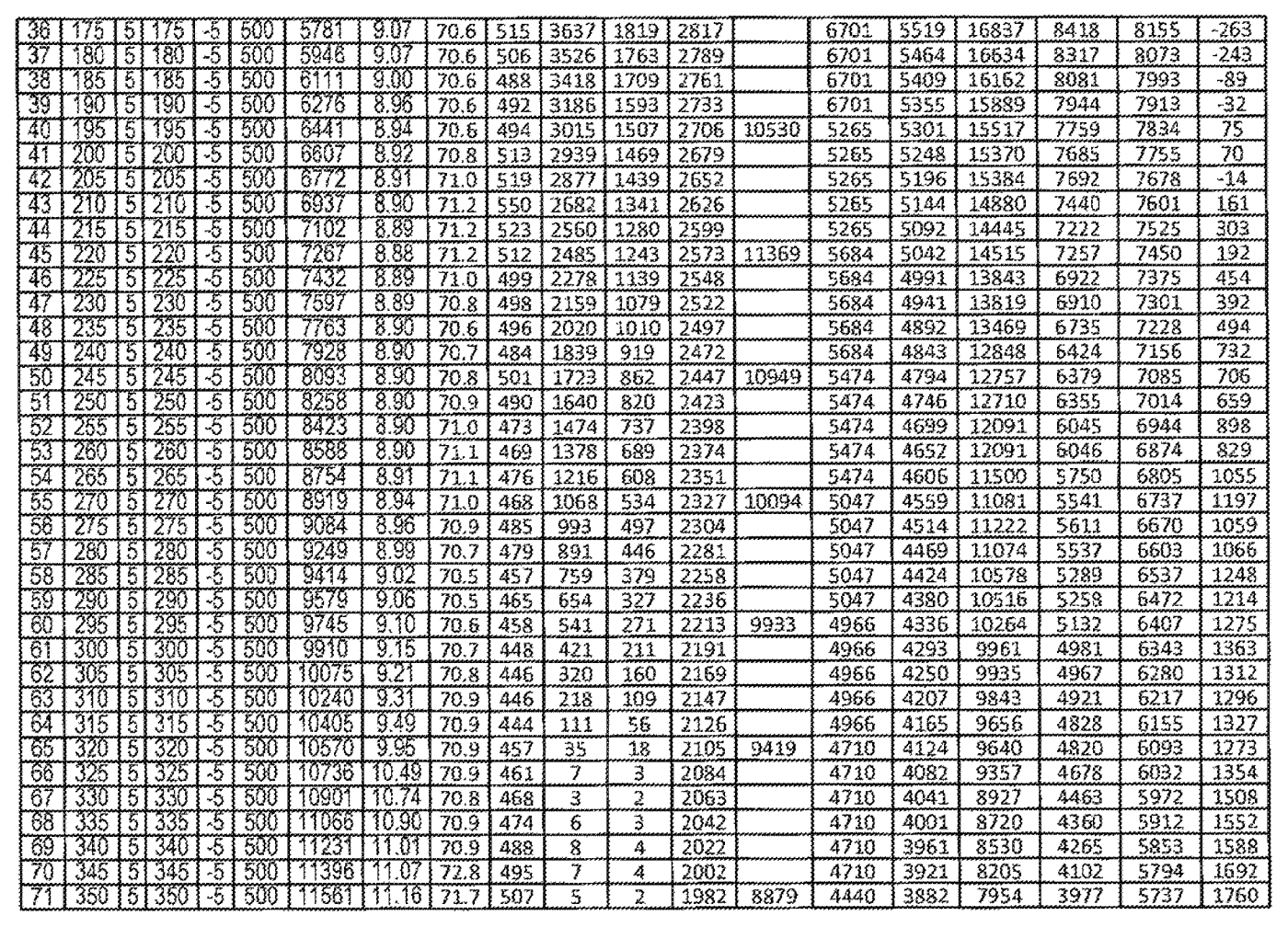
Figure 8:
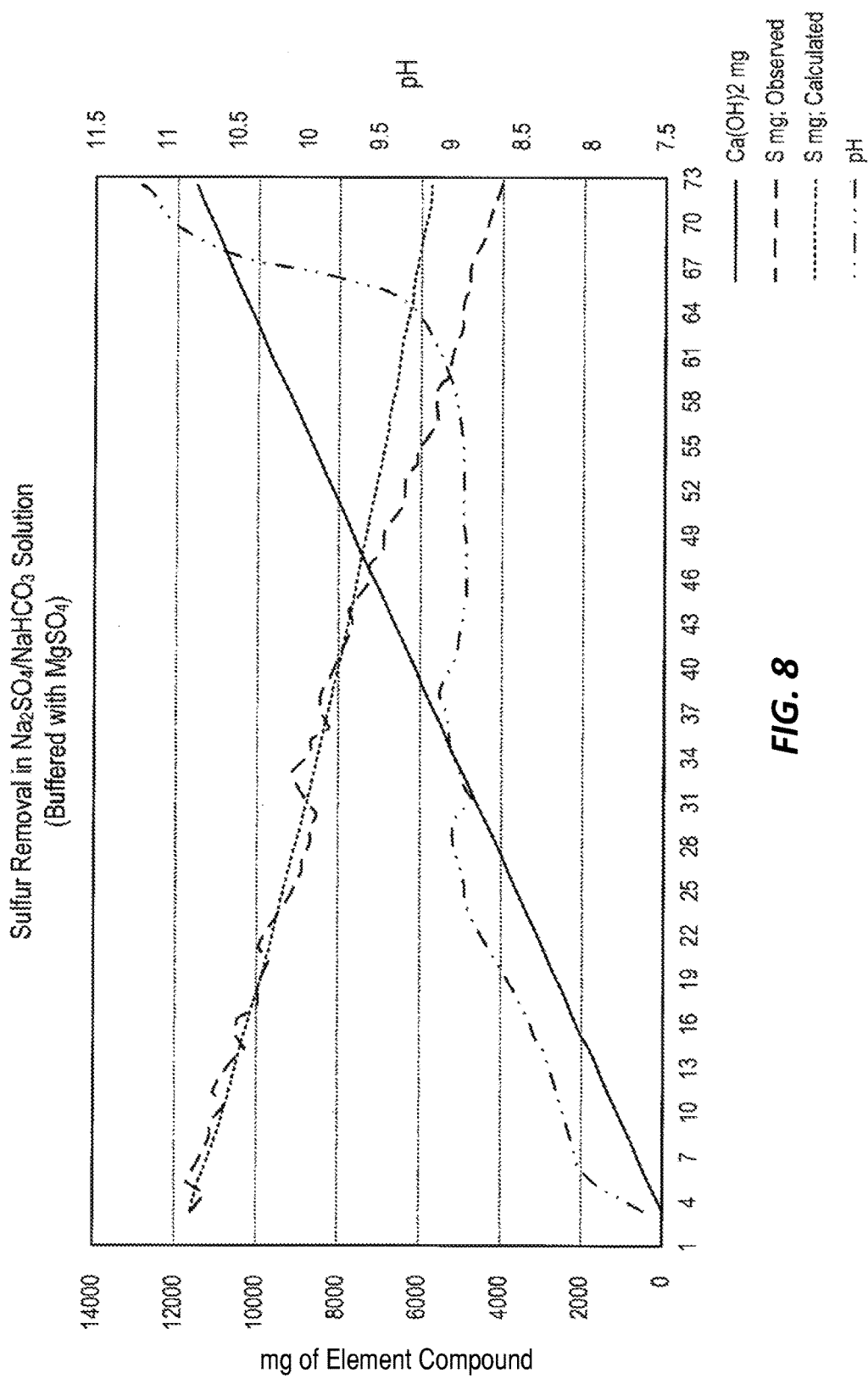
FIG. 8 plots data from FIG. 7 and illustrates sulfur removal.

The concentration of elements was calculated based on the diluting of the initial concentrations of the elements and the results are listed on FIG. 7 (composed of FIGS. 7A and 7B). Table 2 provides column descriptions for the FIG. 7A columns. FIG. 7B columns correspond to the FIG. 7A columns. This diluting happened as a result of sampling and the lime slurry additions. FIG. 8 plots these

TABLE 2

Column Legend:

A = Sample Number
B = Sample Name
C = Milk Added (ml)
D = Milk Added Cumulative (ml)
E = Sample Volume
F = Solution Volume
G = $Ca(OH)_2$ Added (mg)
H = pH
I = Temperature (° C.)
J = Ca (317.933) (mg/L)
K = Mg (279.077) (mg/L)
L = Mg observed (mg)
M = Mg calculated (mg)

TABLE 2-continued

Column Legend:

N = Na, raw data (mg/L)
O = Na observed (mg)
P = Na calculated (mg)
Q = S 180.669 (mg/L)
R = S observed (mg)
S = S calculated (mg)
T = S in $CaSO_4$ (mg of S)

"calculated values" versus values observed in the ICP analysis, for sulfur. When the measured value for sulfur deviated from the calculated value this was an indication that $CaSO_4$ was forming in the solution.

Figure 9:
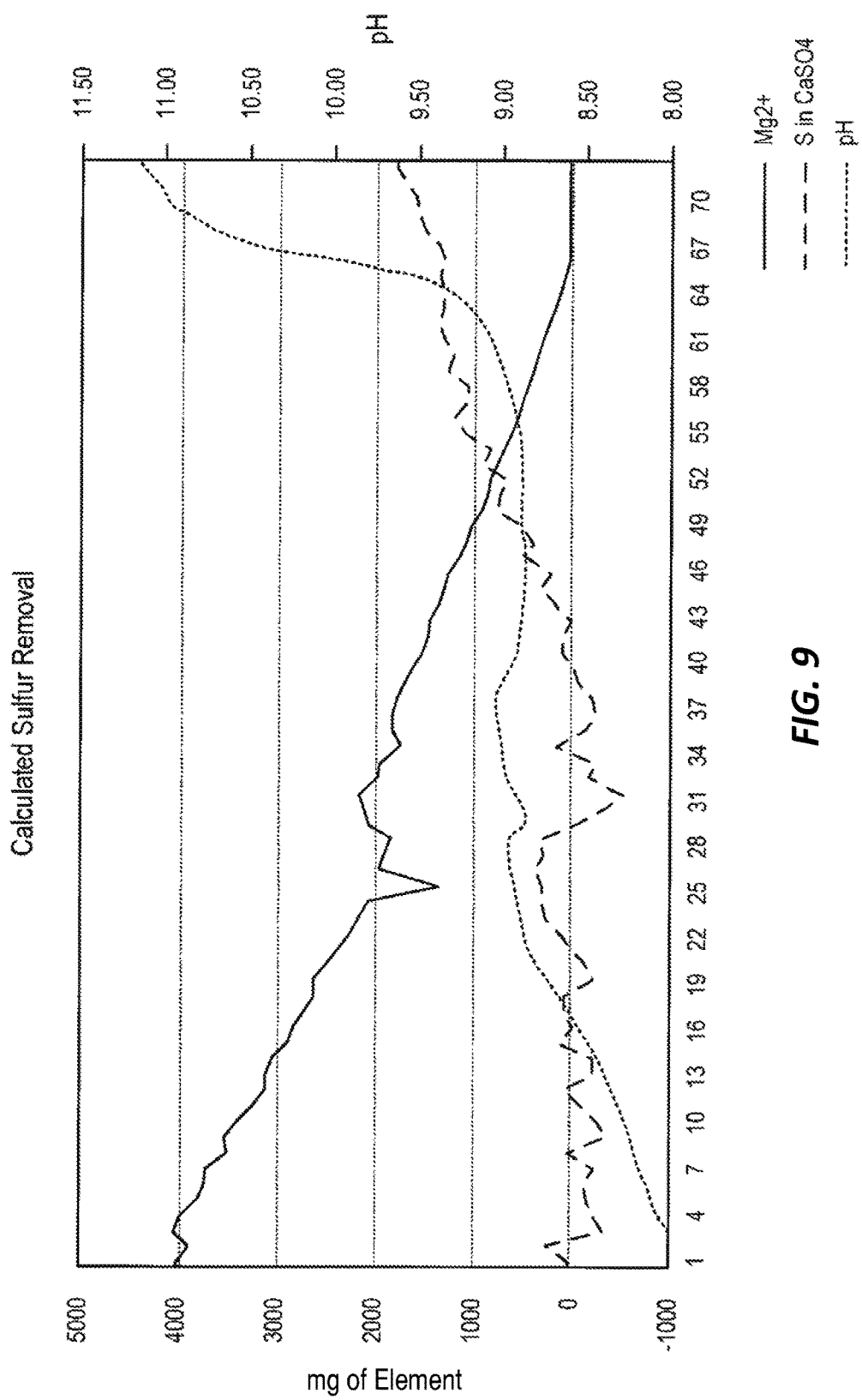
FIG. 9 plots different data from FIG. 7 and further illustrates sulfur removal.

During the experiment, the pH was being buffered at around pH 9 due to the $Mg^{2+}$ ions in solution. Once the $Mg^{2+}$ ions were depleted, the pH went up rapidly (see FIG. 9). FIG. 9 shows the amount of sulfur being removed from the aqueous portion of the reaction. The "S in $CaSO_4$" value was derived by subtracting "observed sulfur" from the "calculated sulfur" of FIG. 7. FIG. 9 also shows $Mg^{2+}$ being depleted throughout the reaction. When $Mg^{2+}$ is close to zero, the pH starts to climb rapidly. The $Mg^{2+}$ was dropping out of the solution as insoluble $Mg(OH)_2$. When there was no more $Mg^{2+}$ to absorb the $OH^-$ ions, the pH went up rapidly. Sulfur removal continued to climb as the pH was increasing; this was evidence that NaOH was being generated.

Example 2

Figure 10:
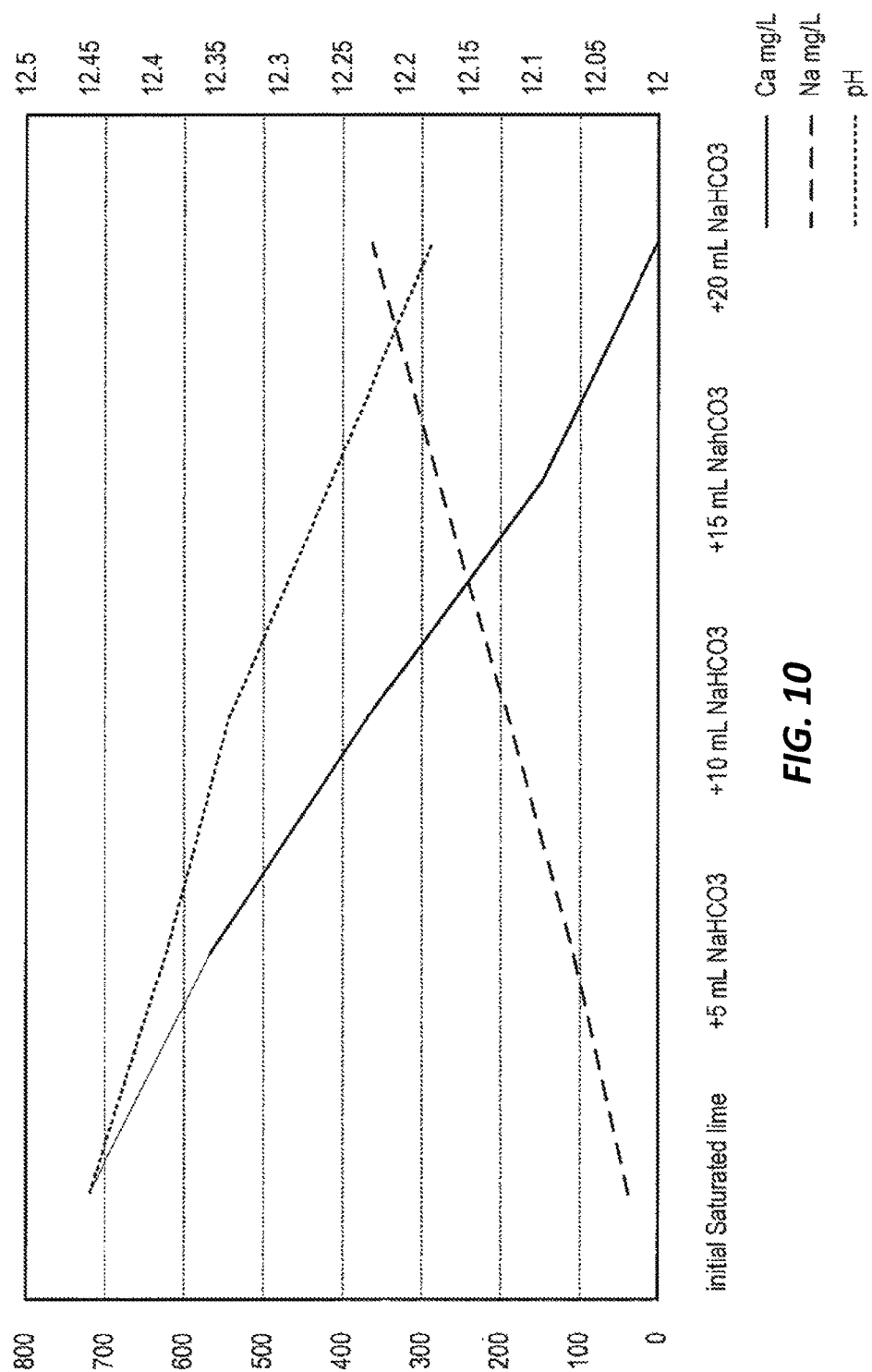
FIG. 10 plots data from Table 3 and illustrates removal of calcium ions by sodium bicarbonate.

An experiment was conducted to illustrate calcium behavior in the presence of $NaHCO_3$, a main component of trona. The $NaHCO_3$ reacted with $Ca^{2+}$ in the solution to produce $CaCO_3$, which is very insoluble. The experimental setup and results are shown in Table 3 and plotted in FIG. 10. These experiments were conducted at 25° C. The same equipment used in Example 1 was also used in Example 2.

TABLE 3

| $NaHCO_3$ Effect on $Ca^{2+}$ ions | Sample Taken mL | Total Volume mL | Theoretical [Na] mg/L | Measured Ca mg/L | Measured Na mg/L | Measured pH | [$NaHCO_3$] = 4.5 g/100 mL $NaHCO_3$ Added(mL) | $NaHCO_3$ Cumulative, mL |
|---|---|---|---|---|---|---|---|---|
| Initial Saturated lime | −5 | 495 | 0 | 713 | 40 | 12.45 | 0 | 0 |
| +5 mL $NaHCO_3$ | −5 | 495 | 124 | 568 | 110 | 12.39 | 5 | 5 |
| +10 mL $NaHCO_3$ | −5 | 495 | 249 | 370 | 194 | 12.34 | 5 | 10 |
| +15 mL $NaHCO_3$ | −5 | 495 | 373 | 147 | 281 | 12.26 | 5 | 15 |
| +20 mL $NaHCO_3$ | −5 | 495 | 498 | 4 | 364 | 12.18 | 5 | 20 |

Example 3

An experiment was conducted to illustrate calcium behavior in the presence of $K_2CO_3$. The $K_2CO_3$ reacted with $Ca^{2+}$ in the solution to produce $CaCO_3$, which is very insoluble. The reaction is as follows: $Ca^{2+}(aq)+CO_3^{2-}(aq)\rightarrow CaCO_3(s)$.

Figure 11:
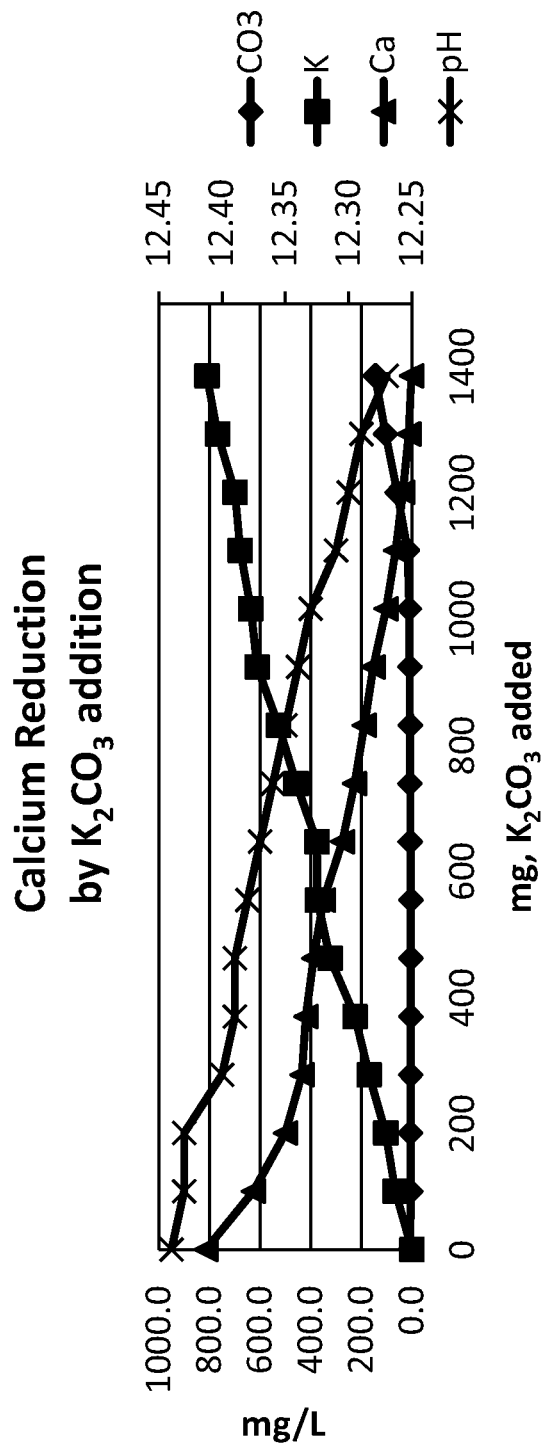
FIG. 11 plots data from Table 4 and illustrates calcium removal by potassium carbonate.

A saturated calcium hydroxide solution was made by adding excess CaO (High-Calcium Quicklime) to deionized water and then filtering to make a clear solution. Specifically, 4.0029 g of CaO was added to 500 mL of water, then filtered to get saturated $Ca(OH)_2$ water. 1.8475 g of $K_2CO_3$ (reagent grade) was added to 200 mL of water. $K_2CO_3$ was then added to 500 ml of the clear saturated lime solution to show that $CO_3$ from $K_2CO_3$ would react with and drop calcium ions from the solution. The results are shown in Table 4 and depicted in FIG. 11. For each addition of $K_2CO_3$ solution, the $Ca^{2+}$ ion concentration was reduced, presumably due to $Ca^{2+}$ reacting with $CO_3$ to form $CaCO_3$. These experiments were conducted at 25° C. Unless specified otherwise, the same equipment and material sources used in Example 1 were also used in Example 3.

Example 4

An experiment was conducted to illustrate calcium behavior in the presence of $Li_2CO_3$. The $Li_2CO_3$ reacted with $Ca^{2+}$ in the solution to produce $CaCO_3$, which is very insoluble. The reaction is as follows: $Ca^{2+}(aq)+CO_3^{2-}(aq)\rightarrow CaCO_3(s)$.

Figure 12:
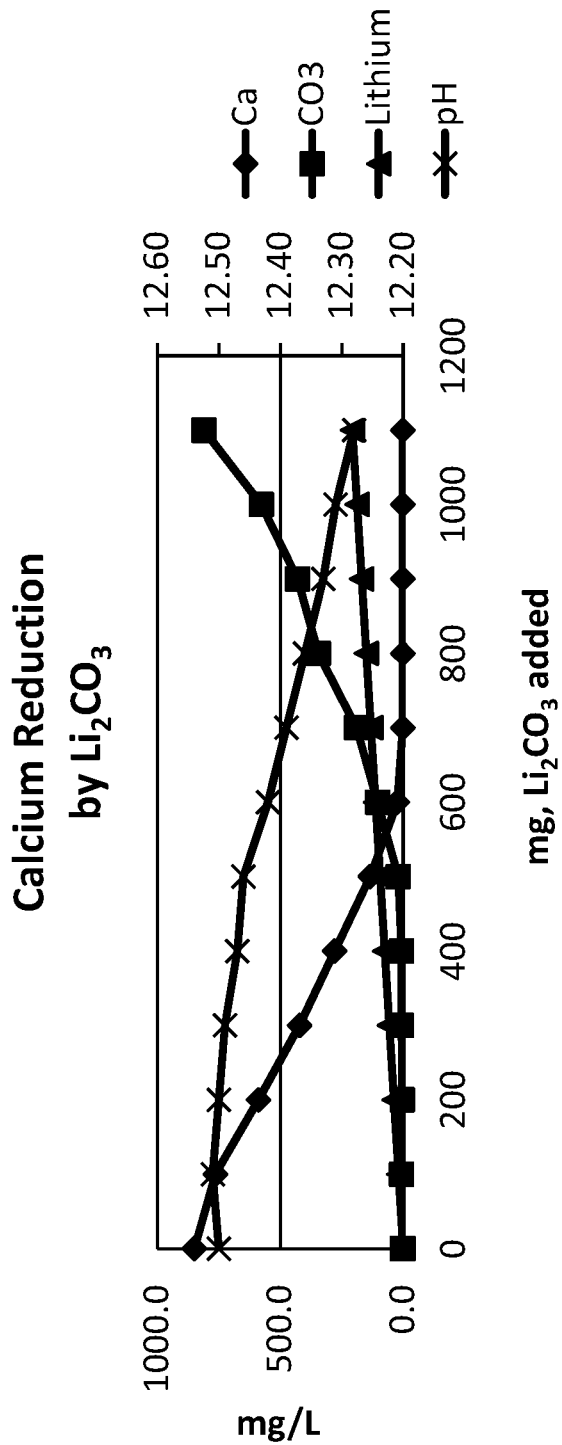
FIG. 12 plots data from Table 5 and illustrates calcium removal by lithium carbonate.

A saturated calcium hydroxide solution was made by adding excess CaO (High-Calcium Quicklime) to deionized water and then filtering to make a clear solution. Specifically, 3.9835 g of CaO was added to 500 mL of water, then filtered to get saturated $Ca(OH)_2$ water. 5 g of $Li_2CO_3$ (reagent grade) was added to 500 mL of water. $Li_2CO_3$ was then added to 500 ml of the clear saturated lime solution to show that $CO_3$ from $Li_2CO_3$ would react with and drop calcium ions from the solution. The results are shown in Table 5 and depicted in FIG. 12. For each addition of $Li_2CO_3$ solution, the $Ca^{2+}$ ion concentration was reduced, due to $Ca^{2+}$ reacting with $CO_3$ to form $CaCO_3$. These experiments were conducted at 25° C. Unless specified otherwise, the same equipment and material sources used in Example 1 were also used in Example 4.

TABLE 4

| $K_2CO_3$ sol'n added ml | $K_2CO_3$ sol'n cum. ml | Samp. taken ml | Total sol'n vol. ml | pH | $K_2CO_3$ added mg | $K^+$ added mg | $CO_3^{2-}$ added mg | ICP [$Ca^{2+}$] mg/l | ICP [$K^+$] mg/l | ICP [$CO_3^{2-}$] mg/l |
|---|---|---|---|---|---|---|---|---|---|---|
| 0.00 |  | −10.00 | 490.00 | 12.44 | 0 | 0 | 0 | 813.8 | 0.3 | 6.9 |
| 10.00 | 10.00 | −10.00 | 490.00 | 12.43 | 92 | 52 | 40 | 627.0 | 66.5 | 5.2 |
| 10.00 | 20.00 | −10.00 | 490.00 | 12.43 | 185 | 105 | 80 | 500.2 | 103.6 | 6.1 |
| 10.00 | 30.00 | −10.00 | 490.00 | 12.40 | 277 | 157 | 120 | 435.2 | 169.8 | 5.3 |
| 10.00 | 40.00 | −10.00 | 490.00 | 12.39 | 370 | 209 | 160 | 418.9 | 225.1 | 4.3 |
| 10.00 | 50.00 | −10.00 | 490.00 | 12.39 | 462 | 261 | 201 | 388.3 | 323.5 | 4.2 |
| 10.00 | 60.00 | −10.00 | 490.00 | 12.38 | 554 | 314 | 241 | 350.0 | 374.0 | 4.7 |
| 10.00 | 70.00 | −10.00 | 490.00 | 12.37 | 647 | 366 | 281 | 275.0 | 376.0 | 7.4 |
| 10.00 | 80.00 | −10.00 | 490.00 | 12.36 | 739 | 418 | 321 | 227.2 | 457.6 | 8.2 |
| 10.00 | 90.00 | −10.00 | 490.00 | 12.35 | 831 | 470 | 361 | 188.7 | 527.5 | 7.1 |
| 10.00 | 100.00 | −10.00 | 490.00 | 12.34 | 924 | 523 | 401 | 153.4 | 611.5 | 8.0 |
| 10.00 | 110.00 | −10.00 | 490.00 | 12.33 | 1016 | 575 | 441 | 102.6 | 637.0 | 10.8 |
| 10.00 | 120.00 | −10.00 | 490.00 | 12.31 | 1109 | 627 | 481 | 64.5 | 678.4 | 18.2 |
| 10.00 | 130.00 | −10.00 | 490.00 | 12.30 | 1201 | 679 | 521 | 36.4 | 699.6 | 58.8 |
| 10.00 | 140.00 | −10.00 | 490.00 | 12.29 | 1293 | 732 | 561 | 13.0 | 768.2 | 104.5 |
| 10.00 | 150.00 | −10.00 | 490.00 | 12.27 | 1386 | 784 | 602 | 2.3 | 810.0 | 145.9 |

TABLE 5

| $Li_2CO_3$ sol'n added ml | $Li_2CO_3$ sol'n cum. ml | samp. taken ml | total sol'n vol. ml | pH | $Li_2CO_3$ added mg | $Li^+$ added mg | ICP [$Ca^{2+}$] mg/l | ICP [$CO_3^{2-}$] mg/l |
|---|---|---|---|---|---|---|---|---|
| 0.00 | 0 | −10.00 | 490.00 | 12.50 | 0 | 0 | 849.8 | 3.6 |
| 10.00 | 10 | −10.00 | 490.00 | 12.51 | 100 | 19 | 764.0 | 6.4 |
| 10.00 | 20 | −10.00 | 490.00 | 12.50 | 200 | 38 | 588.4 | 3.1 |
| 10.00 | 30 | −10.00 | 490.00 | 12.49 | 300 | 56 | 421.8 | 7.2 |
| 10.00 | 40 | −10.00 | 490.00 | 12.47 | 400 | 75 | 278.9 | 6.6 |
| 10.00 | 50 | −10.00 | 490.00 | 12.46 | 500 | 94 | 133.7 | 19.9 |
| 10.00 | 60 | −10.00 | 490.00 | 12.42 | 600 | 113 | 23.7 | 104.1 |
| 10.00 | 70 | −10.00 | 490.00 | 12.39 | 700 | 131 | 1.4 | 189.7 |
| 10.00 | 80 | −10.00 | 490.00 | 12.36 | 800 | 150 | 1.0 | 345.5 |
| 10.00 | 90 | −10.00 | 490.00 | 12.33 | 900 | 169 | 1.0 | 429.6 |
| 10.00 | 100 | −10.00 | 490.00 | 12.31 | 1000 | 188 | 1.1 | 577.0 |
| 10.00 | 110 | −10.00 | 490.00 | 12.28 | 1100 | 207 | 1.1 | 811.0 |
| 10.00 | 120 | −10.00 | 490.00 | 12.26 | 1200 | 225 | 1.1 | 799.9 |
| 10.00 | 130 | −10.00 | 490.00 | 12.23 | 1300 | 244 | 1.1 | 970.6 |
| 10.00 | 140 | −10.00 | 490.00 | 12.21 | 1400 | 263 | 1.2 | 1273.6 |
| 10.00 | 150 | −10.00 | 490.00 | 12.19 | 1500 | 282 | 1.2 | 1301.7 |

TABLE 5-continued

| Li$_2$CO$_3$ sol'n added ml | Li$_2$CO$_3$ sol'n cum. ml | samp. taken ml | total sol'n vol. ml | pH | Li$_2$CO$_3$ added mg | Li$^{2+}$ added mg | ICP [Ca$^{2+}$] mg/l | ICP [CO$_3^{2-}$] mg/l |
|---|---|---|---|---|---|---|---|---|
| 10.00 | 160 | −10.00 | 490.00 | 12.18 | 1600 | 301 | 1.2 | 1511.7 |
| 10.00 | 170 | −10.00 | 490.00 | 12.17 | 1700 | 319 | 1.2 | 1633.6 |
| 10.00 | 180 | −10.00 | 490.00 | 12.15 | 1800 | 338 | 1.2 | 1609.5 |
| 10.00 | 190 | −10.00 | 490.00 | 12.15 | 1900 | 357 | 1.2 | 1913.3 |
| 10.00 | 200 | −10.00 | 490.00 | 12.14 | 2000 | 376 | 1.3 | 2098.6 |

A higher concentration of carbonate ions was added in Example 4 as compared to Example 3. The same reduction in calcium was achieved, but in fewer iterations.

The following equipment and reagents were used in Examples 5 and 6:
ICP Spectrometer; Perkin Elmer 7300V
pH Meter; Orion 920A+
100 mesh sieve
Anhydrous Magnesium Chloride; Reagent Grade
Sodium Sulfate; Reagent Grade
Sodium Bicarbonate (Arm & Hammer® baking soda)
Lime—Quicklime obtained from Graymont (PA) Inc. (Pleasant Gap, Pa.).
Masterflex Peristaltic pump, with 2.79 mm tygon tubing Example 5

Experiments were conducted to prove the feasibility of the reaction below.

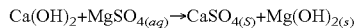

$$Ca(OH)_2 + MgSO_{4(aq)} \rightarrow CaSO_{4(S)} + Mg(OH)_{2(s)}$$

MgCl$_2$ was used as our source of Mg$^{2+}$ ions. It is expected that Mg$^{2+}$ ions from MgSO$_4$ would behave similarly as those from MgCl$_2$. Therefore, the MgCl$_2$ data is representative.

This experiment was repeated several times with varying MgCl$_2$ concentrations according to Table 6. Pleasant Gap quicklime was used for all experiments. The quicklime was slaked and filtered through a 100 mesh sieve. All experiments were run until the full 300 ml of each reactant was used up. Liquid samples were analyzed to measure the sulfur reduction in the fluid stream. Sulfur removal was calculated based on the difference between the mixed and final solutions (reduction in sulfur=initial solution/2−final solution). A sample of initial stock Na$_2$SO$_4$ solution was analyzed for sulfur concentration. The mixed solution was estimated by dividing initial concentration by 2, since the mixed solution was a 1:1 mixture (by volume) of the lime solution and the Na$_2$SO$_4$ solution. The final filtered solution was analyzed for sulfur.

For experiment 6, a lower pH of initial stock solution (Na$_2$SO$_4$/MgCl$_2$) was used. The initial pH was 8.73. 1.3 ml of 1N HCl was added to get to pH 5.02, but this value was not stable and kept rising. Another 0.08 ml was added and the pH dropped rapidly back down to below 5. Experiment 6 was started at that point.

TABLE 6

| Exp. No. | Comp. | Theoretical Conc. Needed | | | | Volume, ml | Actual Conc. Used | | |
|---|---|---|---|---|---|---|---|---|---|
| | | Initial Conc. | Mixed Conc. | Initial Molar | Mixed Molar | | CaO | Na$_2$SO$_4$ | MgCl$_2$ |
| 1 | CaO(Lime) | 78.86 g/L | 39.43 g/L | 1.408 | 0.704 | 300 | 24 g/300 ml | 60 g/300 ml | 0 g/300 ml |
| | Na$_2$SO$_4$ | 200 g/L | 100 g/L | 1.408 | 0.704 | 300 | | | |
| | MgCl$_2$ | 0 g/L | 0 g/L | 0.000 | 0.000 | 300 | | | |
| 2 | CaO(Lime) | 78.86 g/L | 39.43 g/L | 1.408 | 0.704 | 300 | 24 g/300 ml | 60 g/300 ml | 20 g/300 ml |
| | Na$_2$SO$_4$ | 200 g/L | 100 g/L | 1.408 | 0.704 | 300 | | | |
| | MgCl$_2$ | 66.64 g/L | 33.32 g/L | 0.700 | 0.350 | 300 | | | |
| 3 | CaO(Lime) | 78.86 g/L | 39.43 g/L | 1.408 | 0.704 | 300 | 24 g/300 ml | 60 g/300 ml | 42.2 g/300 ml |
| | Na$_2$SO$_4$ | 200 g/L | 100 g/L | 1.408 | 0.704 | 300 | | | |
| | MgCl$_2$ | 133.28 g/L | 66.64 g/L | 1.408 | 0.704 | 300 | | | |
| 4 | CaO(Lime) | 78.86 g/L | 39.43 g/L | 1.408 | 0.704 | 300 | 39.86/500 ml | 100 g/500 ml | 16.66 g/500 ml |
| | Na$_2$SO$_4$ | 200 g/L | 100 g/L | 1.408 | 0.704 | 300 | | | |
| | MgCl$_2$ | 33.32 g/L | 16.66 g/L | 0.350 | 0.175 | 300 | | | |
| 5 | CaO(Lime) | 78.86 g/L | 39.43 g/L | 1.408 | 0.704 | 300 | 39.86/500 ml | 100 g/500 ml | 49.98 g/500 ml |
| | Na$_2$SO$_4$ | 200 g/L | 100 g/L | 1.408 | 0.704 | 300 | | | |
| | MgCl$_2$ | 99.96 g/L | 49.98 g/L | 1.056 | 0.528 | 300 | | | |
| 6 | CaO(Lime) | 78.86 g/L | 39.43 g/L | 1.408 | 0.704 | 500 | 39 g/500 ml | 100 g/500 ml | 32.32 g/500 ml |
| | Na$_2$SO$_4$ | 200 g/L | 100 g/L | 1.408 | 0.704 | 500 | | | |
| | MgCl$_2$ | 66.64 g/L | 33.32 g/L | 0.700 | 0.350 | 500 | | | |

A solution was made containing 100 g/L NaSO$_4$ and MgCl$_2$. The second solution was a milk of lime solution (water and CaO); these two solutions were mixed together to complete the following reaction.

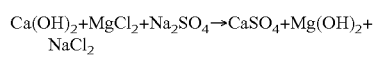

$$Ca(OH)_2 + MgCl_2 + Na_2SO_4 \rightarrow CaSO_4 + Mg(OH)_2 + NaCl_2$$

Figure 13:
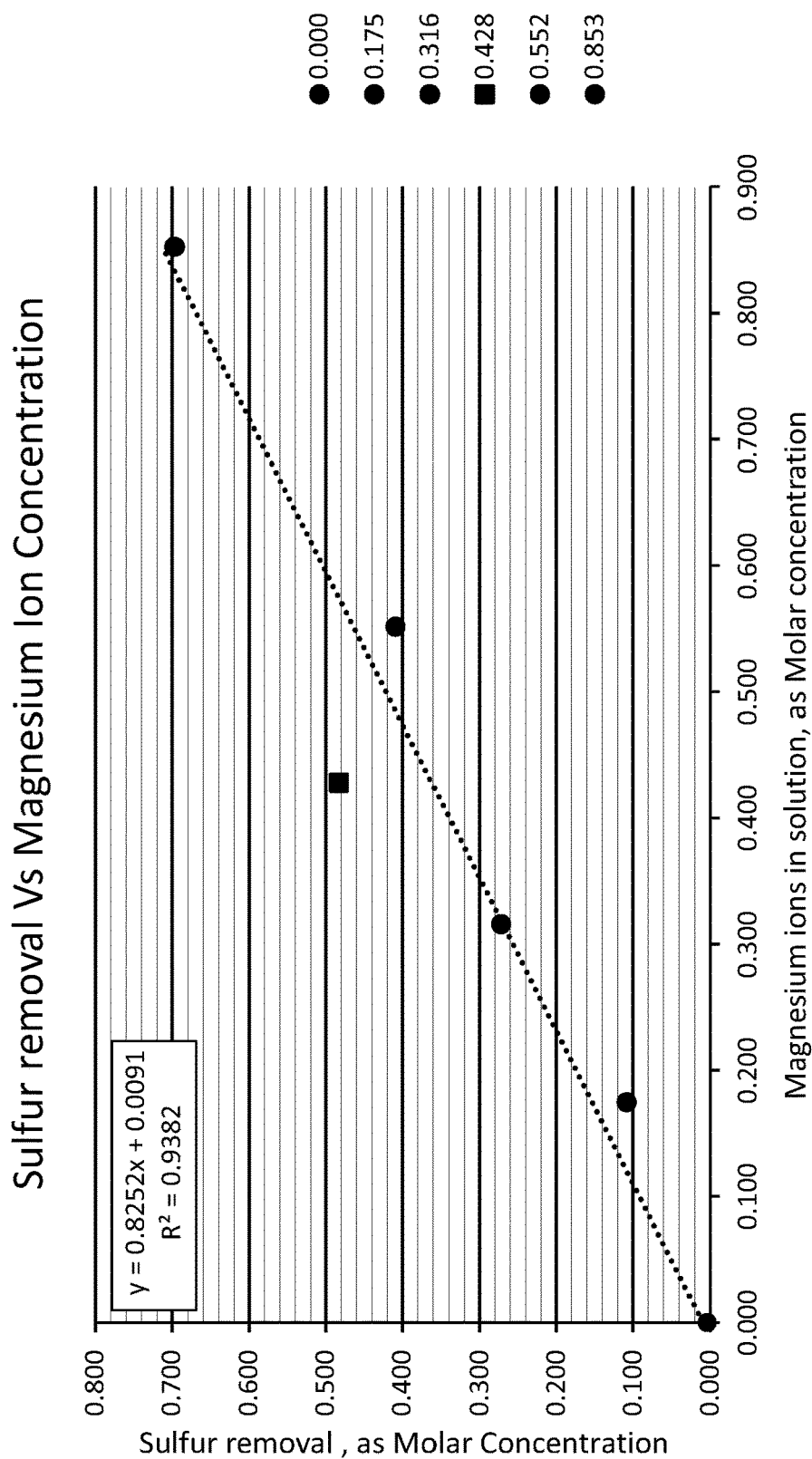
FIG. 13 plots data illustrating sulfur removal in the presence of magnesium ions.

For every mole of Mg added to the reaction, 1 mole of sulfur was removed from the solution. This data is depicted in the graph of FIG. 13. Experiments 1-5 are represented by the black dots. Experiment 6 is represented by the black square. In this graph, the x-axis represents how much Mg was in the initial NaSO$_4$/MgCl$_2$ solution. The y-axis represents how much sulfur was removed from the initial solution. The experiments confirm the feasibility of regeneration of $Mg(OH)_2$ from $MgSO_4$ and the increase in sulfur removal efficiency in relation to increased Mg ion concentration.

Example 6

Figure 14:
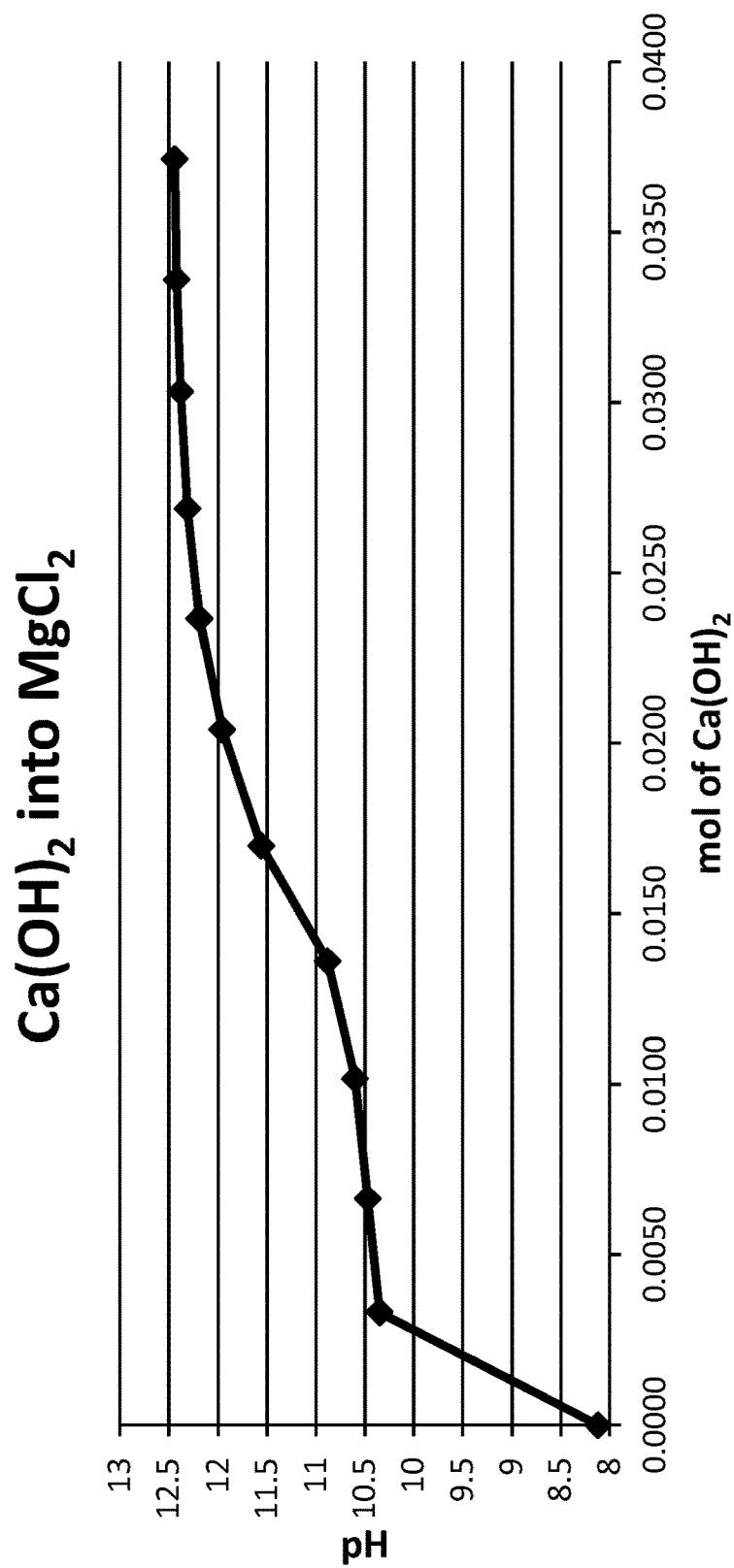
FIG. 14 plots data illustrating pH buffering of calcium hydroxide by magnesium ions.

In this experiment a potential pH range was determined for the regeneration reaction evaluated in Example 5. A solution of $NaHCO_3$ (0.28 g/500 ml), $Na_2SO_4$ (2 g/500 ml) and $MgCl_2$ (1.28 g/500 ml) giving a pH of 8.12 was started with. Powdered $Ca(OH)_2$ was then added to this solution in 0.25 g increments and the pH was plotted against the addition of $Ca(OH)_2$. The results obtained are depicted in FIG. 14. The Mg ions buffered the solution to about pH 10-11. Once the Mg ions were depleted, the pH quickly went to 12.5. Presumably, at pH 12.5 calcium from $Ca(OH)_2$ was no longer able to go into solution and the sulfur removal stopped. Sulfur removal was not measured in this experiment.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

The invention claimed is:

1. A process comprising:
oxidizing a metal sulfide in an oxidizer solution;
mixing alkali metal- or alkali earth metal-containing compounds from a supply system with the oxidizer solution and generating an aqueous sulfate;
separating solid oxidized ore from the aqueous sulfate;
mixing lime with the aqueous sulfate, thereby forming hydroxide and solid sulfate;
separating the solid sulfate from the hydroxide;
after separating the solid sulfate, mixing the hydroxide with a carbonate-containing solution to form a mixed solution; and
recycling at least a portion of the mixed solution to the supply system.

2. The process of claim 1, wherein:
the alkali metal- or alkali earth metal-containing compound comprises sodium hydroxide, magnesium hydroxide, trisodium hydrogendicarbonate dihydrate, sodium carbonate, sodium bicarbonate, magnesium carbonate, potassium hydroxide, potassium carbonate, potassium bicarbonate, lithium carbonate, lithium bicarbonate, lithium hydroxide, or combinations thereof,
the lime comprises quicklime, slaked lime, dolomitic lime, slaked dolomitic lime, or combinations thereof, and
the solid sulfate comprises gypsum.

3. The process of claim 1, further comprising controlling the pH of the oxidizer solution with the alkali metal- or alkali earth metal-containing compound.

4. The process of claim 1, wherein:
the oxidizing is conducted under alkaline conditions at a pH greater than about 8,
the oxidizing is conducted at about ambient temperature to about 90° C.,
mixing lime with the aqueous sulfate comprises mixing a lime slurry with the aqueous sulfate,
the hydroxide formed by mixing the lime with the aqueous sulfate comprises
aqueous sodium hydroxide, aqueous magnesium hydroxide, solid magnesium hydroxide, or combinations thereof, and
the alkali metal- or alkali earth metal-containing compounds comprise a sodium-containing compound, wherein the lime comprises high-calcium lime, and wherein the hydroxide formed by mixing with lime comprises aqueous sodium hydroxide.

5. The process of claim 1, wherein the alkali metal- or alkali earth metal-containing compounds comprise a magnesium-containing compound, wherein the lime comprises dolomitic lime, and wherein the hydroxide formed by mixing with lime comprises solid magnesium hydroxide, the process further comprising:
maintaining calcium hydroxide and magnesium hydroxide in solution and removing solid calcium sulfate as it is formed.

6. The process of claim 5, wherein separating the solid sulfate from hydroxide comprises separating solid magnesium hydroxide along with solid calcium sulfate from aqueous sodium hydroxide.

7. The process of claim 1, further comprising:
removing calcium ions from the mixed solution.

8. The process of claim 1, further comprising seeding the hydroxide with calcium carbonate crystals.

9. The process of claim 1, further comprising removing at least a portion of solids from the mixed solution, wherein recycling at least a portion of the mixed solution occurs after removing at least a portion of the solids from the mixed solution.

10. A system comprising:
an ore supply system;
an oxidizing agent supply system;
a pH modifier supply system configured to supply alkali metal- or alkali earth metal-containing compounds;
an oxidizer system in communication with the ore supply system, the oxidizing agent supply system, and the pH modifier supply system, the oxidizer system configured to oxidize sulfidic ore;
a first separation system in communication with the oxidizer system and configured to receive solid oxidized ore and aqueous sulfates from the oxidizer system and configured to separate the solid oxidized ore from the aqueous sulfates;
a regeneration system in communication with the first separation system and configured to receive at least a portion of the aqueous sulfates, the regeneration system in communication with a lime supply system and configured to react the aqueous sulfates with calcium hydroxide, magnesium hydroxide, or both from the lime supply system, and thereby form solid calcium sulfate and additional hydroxide;
a second separation system in communication with the regeneration system and configured to separate the solid calcium sulfate from the additional hydroxide and any residual calcium hydroxide or magnesium hydroxide from the lime supply system;
a calcium removal system in communication with the second separation system, wherein the calcium removal system is configured to receive carbonate ion-generating compounds and produce a mixed solution; and
a recycle stream configured to recycle a portion of the mixed solution to the pH modifier supply system.

11. The system of claim 10, wherein the oxidizer system comprises an oxidizer vessel configured to operate under alkaline conditions at a pH greater than about 8.

12. The system of claim 10, wherein:
the regeneration system comprises a regeneration vessel configured to mix lime with the aqueous sulfate stream,
the additional hydroxide comprises aqueous sodium hydroxide, aqueous magnesium hydroxide, solid magnesium hydroxide, or combinations thereof.

13. The system of claim 10, wherein:
the alkali metal- or alkali earth metal-containing compounds comprise a sodium-containing compound, wherein the lime comprises high-calcium lime, and wherein the additional hydroxide comprises aqueous sodium hydroxide,
the second separation system is configured to maintain calcium hydroxide in solution and to remove solid calcium sulfate as it is formed, and
the second separation system is configured to separate solid calcium hydroxide along with solid calcium sulfate from the aqueous sodium hydroxide.

14. The system of claim 10, wherein:
the alkali metal- or alkali earth metal-containing compounds comprise a magnesium-containing compound, wherein the lime comprises dolomitic lime, and wherein the additional hydroxide comprises solid magnesium hydroxide, and
the second separation system is configured to (a) maintain calcium hydroxide and magnesium hydroxide in solution, (b) remove solid calcium sulfate as it is formed, and (c) separate solid magnesium hydroxide along with solid calcium sulfate from aqueous sodium hydroxide.

15. The system of claim 10 wherein the calcium removal system is configured to remove calcium ions from the mixed solution.

16. The system of claim 10 wherein the carbonate ion-generating compounds comprise sodium carbonate, sodium bicarbonate, potassium carbonate, potassium bicarbonate, lithium carbonate, lithium bicarbonate, trisodium hydrogendicarbonate dihydrate, or combinations thereof.

17. The system of claim 10 wherein the carbonate ion-generating compounds are supplied by the pH modifier supply system.

18. The system of claim 15, wherein the calcium removal system is configured to seed the additional hydroxide with calcium carbonate crystals, the system further comprising:
a third separation system in communication with the calcium removal system and configured to separate solid calcium carbonate from the additional hydroxide, and wherein a recycle system is in communication with the third separation system and configured to direct the additional hydroxide from the third separation system to the pH modifier supply system.

19. The system of claim 15, wherein:
the calcium removal system is in communication with the pH modifier supply system and is configured to purify the alkali metal- or alkali earth metal-containing compounds prior to introduction of the alkali metal- or alkali earth metal-containing compounds to the oxidizer system.

20. A method for generating an alkali process stream, comprising:
separating a first stream into a second stream comprising solid calcium sulfate, and a third stream comprising hydroxide;
mixing carbonate-ion generating compounds with at least a portion of the hydroxide from the third stream to form a mixed solution, the mixed solution comprising calcium carbonate and sodium hydroxide;
removing at least a portion of the calcium carbonate from the mixed solution; and
after removing the at least a portion of the calcium carbonate, conveying a fourth stream including at least a portion of the sodium hydroxide from the mixed solution to at least one of a supply system or an oxidizer system.

21. The method of claim 20 wherein the first stream is a regenerated product stream comprising sodium hydroxide and calcium sulfate.

22. The method of claim 20 wherein mixing the carbonate-ion generating compounds with the hydroxide occurs via a calcium removal system, the method further comprising delivering the carbonate-ion generating compounds to the calcium removal system from a carbonate supply.

23. The method of claim 22 wherein the removed calcium carbonate comprises solid calcium carbonate, the method further comprising conveying the solid calcium carbonate to the carbonate supply.

24. The method of claim 20 wherein conveying the fourth stream includes conveying the fourth stream to the supply system, the method further comprising:
reacting alkali metal- or alkali earth metal-containing compounds from the supply system with an ore feed stream to form an oxidized solution;
separating the oxidized solution into a fourth stream comprising sodium sulfate; and
mixing the sodium sulfate from the fourth stream with lime to form the first stream.

* * * * *